United States Patent
Zhang et al.

(10) Patent No.: US 9,648,595 B2
(45) Date of Patent: May 9, 2017

(54) APPARATUS AND METHOD FOR TRANSMITTING/RECEIVING PHYSICAL UPLINK SHARED CHANNEL SIGNAL IN CELLULAR RADIO COMMUNICATION SYSTEM SUPPORTING CARRIER AGGREGATION SCHEME

(71) Applicant: Samsung Electronics Co. Ltd., Suwon-si, Gyeonggi-do (KR)

(72) Inventors: Shichang Zhang, Beijing (CN); Jingxing Fu, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 13/745,113

(22) Filed: Jan. 18, 2013

(65) Prior Publication Data
US 2013/0188532 A1    Jul. 25, 2013

(30) Foreign Application Priority Data

Jan. 20, 2012 (CN) .......................... 2012 1 0019146
Jan. 31, 2012 (CN) .......................... 2012 1 0021903
Feb. 24, 2012 (CN) .......................... 2012 1 0046435

(51) Int. Cl.
*H04W 72/04* (2009.01)
*H04B 7/26* (2006.01)
(Continued)

(52) U.S. Cl.
CPC ...... *H04W 72/0413* (2013.01); *H04B 7/2656* (2013.01); *H04L 5/001* (2013.01);
(Continued)

(58) Field of Classification Search
None
See application file for complete search history.

(56) References Cited

U.S. PATENT DOCUMENTS

| | | | |
|---|---|---|---|
| 9,019,871 B2* | 4/2015 | Yang | H04L 5/0055 370/280 |
| 2010/0041428 A1* | 2/2010 | Chen et al. | 455/522 |
| 2011/0134774 A1 | 6/2011 | Pelletier et al. | |
| 2011/0305161 A1 | 12/2011 | Ekpenyong et al. | |
| 2012/0257554 A1 | 10/2012 | Kim et al. | |
| 2013/0295949 A1* | 11/2013 | Seo et al. | 455/452.1 |
| 2014/0029490 A1* | 1/2014 | Kim et al. | 370/280 |
| 2014/0036814 A1* | 2/2014 | Zhang et al. | 370/329 |

FOREIGN PATENT DOCUMENTS

KR    10-2011-0073689 A    6/2011

OTHER PUBLICATIONS

Samsung, 'Data Scheduling in CA with Different TDD UL-DL Configurations', R1-113082, 3GPP TSG RAN WG1 #66bis, Zhuhai, China, Oct. 10-14, 2011, pp. 1-3.

(Continued)

*Primary Examiner* — Donald Mills
(74) *Attorney, Agent, or Firm* — Jefferson IP Law, LLP

(57) ABSTRACT

An apparatus and a method for transmitting/receiving a Physical Uplink Shared CHannel (PUSCH) signal in a cellular radio communication system supporting a Carrier Aggregation (CA) scheme are provided. In the PUSCH transmission method, a User Equipment (UE) transmits a PUSCH signal to a Base Station (BS) based on an UpLink (UL)/DownLink (DL) Configuration, wherein, for a Time Division Duplexing (TDD) scheme, if the UE is configured with more than one serving cell, UL/DL Configurations of at least two serving cells are different, and a serving cell is one of a primary cell and a secondary cell, a UL/DL Configuration for the serving cell is set as a UL-reference UL/DL Configuration based on a pair formed by a UL/DL Configuration for another serving cell and the UL/DL Configuration for the serving cell.

56 Claims, 13 Drawing Sheets

(51) Int. Cl.
H04L 5/00 (2006.01)
H04L 5/14 (2006.01)
H04L 5/16 (2006.01)

(52) U.S. Cl.
CPC .......... *H04L 5/1469* (2013.01); *H04L 5/0092* (2013.01); *H04L 5/16* (2013.01)

(56) References Cited

OTHER PUBLICATIONS

Samsung, 'DL/UL HARQ-ACK Transmission in CA with Different TDD UL-DL Configurations', R1-113081, 3GPP TSG RAN WG1 #66bis, Zhuhai, China, Oct. 10-14, 2011, pp. 1-5.
3GPP TSG RAN WG1 Meeting #71, RAN1 Chairman's Notes, Nov. 12-16, 2012, pp. 1-49.
R1-1249008, 3GPP TSG-RAN WG1 Meeting #71, Remaining Issue on PUSCH Cross-Carrier Scheduling Case D in Inter-band CA, Nov. 12-16, 2012, pp. 1-3.
R1-125305, 3GPP TSG RAN WG1 #71, Way forward on PUSCH Case D, Nov. 13-17, 2012, pp. 1-2.
Yuan et al.; Relay Backhaul Subframe Allocation in LTE-Advanced for TDD; Aug. 25, 2015; XP031847204.
CATT; Design of TDD inter-band Carrier Aggregation; 3GPP TSG RAN WG1 Meeting #67; R1-113724; Nov. 14-18, 2011; XP050561843; San Francisco, CA.
Samsung; Scheduling timing in CA with different TDD UL-DL configurations; 3GPP TSG RAN WG1 #67; R1-114219; Nov. 14-18, 2011; XP050562148; San Francisco, CA.
LG Electronics; Overall structure of TDD CA with different UL-DL configurations based on half-duplex operation; 3GPP TSG RAN WG1 #67; R1-113973; Nov. 14-18, 2011; XP050562286; San Francisco, CA.
3GPP TS 36.213 V10.4.0, 3GPP, Dec. 2011, Dec. 2011.

\* cited by examiner

APPARATUS AND METHOD FOR TRANSMITTING/RECEIVING PHYSICAL UPLINK SHARED CHANNEL SIGNAL IN CELLULAR RADIO COMMUNICATION SYSTEM SUPPORTING CARRIER AGGREGATION SCHEME

PRIORITY

This application claims the benefit under 35 U.S.C. §119(a) of a Chinese patent application filed on Jan. 20, 2012 in the State Intellectual Property Office (SIPO) of the Peoples' Republic of China and assigned Serial No. CN 201210019146.1, a Chinese patent application filed on Jan. 31, 2012 in the SIPO and assigned Serial No. CN 201210021903.9, and a Chinese patent application filed on Feb. 24, 2012 in the SIPO and assigned Serial No. CN 201210046435.0, the entire disclosure of each of which is hereby incorporated by reference.

BACKGROUND OF THE INVENTION

1. Field of the Invention

The present invention relates to an apparatus and method for transmitting/receiving a Physical Uplink Shared CHannel (PUSCH) signal in a cellular radio communication system supporting a Carrier Aggregation (CA) scheme. More particularly, the present invention relates to an apparatus and method for transmitting/receiving a PUSCH signal if an UpLink (UL) Configuration for carrier aggregated cells is different from a DownLink (DL) Configuration for the carrier aggregated cells in a Time Division Duplexing (TDD) communication system supporting a CA scheme.

2. Description of the Related Art

Long Term Evolution (LTE) technology supports two duplexing modes, i.e., Frequency Division Duplexing (FDD) and Time Division Duplexing (TDD).

FIG. 1 is a schematic diagram of a frame structure of LTE TDD system according to the related art.

Referring to FIG. 1, a length of each radio frame is 10 milliseconds (ms). Each radio frame is equally divided into two half-frames and the length of each half-frame is 5 ms. Each half-frame includes eight time slots of 0.5 ms and three special domains. The total length of the three special domains is 1 ms. The three special domains respectively are a Downlink Pilot Time Slot (DwPTS), a Guard Period (GP) and an Uplink Pilot Time Slot (UpPTS), and each sub-frame consists of two consecutive time slots.

Transmissions in the TDD system include a transmission from a base station to a User Equipment (UE) (referred to as downlink) and a transmission from the UE to the base station (referred to as uplink). Based on the frame structure shown in FIG. 1, the uplink and downlink share 10 sub-frames within each 10 ms, and each sub-frame is either configured for the uplink or configured for the downlink. The sub-frame configured for the uplink is referred to as an uplink sub-frame, while the sub-frame configured for the downlink is referred to as a downlink sub-frame. TDD system supports seven Uplink/Downlink Configurations, as shown in Table 1, D represents a downlink sub-frame, U represents an uplink sub-frame, S represents a special sub-frame including the above three special domains.

TABLE 1

| Configuration serial number | Breaking point cycle | Sub-frame index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

LTE TDD system supports a Hybrid Automatic Repeat reQuest (HARQ) mechanism, the basic principles of which include that a base station allocates uplink resources for a UE, the UE transmits uplink data to the base station using the uplink resources, the base station receives the uplink data and sends HARQ indication information to the UE, and the UE retransmits the uplink data in accordance with the indication information. Specifically, the UE carries the uplink data via a Physical Uplink Shared CHannel (PUSCH), the base station carries scheduling and control information of the PUSCH, i.e., the UL Grant, via a Physical Downlink Control CHannel (PDCCH), and the base station carries the HARQ indication information via a Physical HARQ Indicator CHannel (PHICH). In the above process, a timing position of the PUSCH in one transmission and the subsequent retransmission timing positions are determined based on pre-configured timing relationships, which include a timing relationship from the UL Grant to the PUSCH, a timing relationship from the PHICH to the PUSCH, and a timing relationship from the PUSCH to the PHICH. The above three timing relationships are hereinafter referred to as the PUSCH timing relationship.

Firstly, the timing relationship from the UL Grant or PHICH to the PUSCH in the LTE and LTE-Advanced (LTE-A) is introduced.

For the timing relationship from the UL Grant to the PUSCH, it is assumed that a UE receives UL Grant in a downlink sub-frame n (n is an index number of the sub-frame, and the following is the same), the UL Grant is used for controlling the PUSCH within the uplink sub-frame n+k. Values of k are defined in Table 2. Specifically, for TDD Uplink/Downlink Configurations (or referred to as Uplink/Downlink Configuration for short) 1 to 6, the number of the uplink sub-frames is less than or equal to the number of the downlink sub-frames (S frame can be used as a downlink sub-frame), and for a certain downlink sub-frame n, a unique PUSCH timing relationship may be configured by a unique value of k, which is reflected in Table 2. Here, the PUSCH may not be scheduled within a downlink sub-frame, or the PUSCH within one uplink sub-frame may only be scheduled. For the TDD Uplink/Downlink Configuration 0, the number of the uplink sub-frames is greater than the number of the downlink sub-frames, and the PDCCH of each downlink sub-frame needs to be schedule the PUSCHs within two uplink sub-frames, so that the value of k could not be unique. The Uplink index (UL index) technology is needed to support the scheduling of the PUSCHs within two uplink sub-frames in the PDCCH, wherein different k values are used for indexing different PUSCHs. For example, when the UE receives the PDCCH within a downlink sub-frame 0, the PDCCH schedules the PUSCHs within an uplink sub-frame 4 and/or an uplink sub-frame 7. When the UE receives the PDCCH within a downlink sub-frame 1, the PDCCH schedules the PUSCHs within an uplink sub-frame 7 and/or an uplink sub-frame 8. Table 2 showing a timing relationship from the UL Grant to the PUSCH is provided below.

TABLE 2

| Configuration serial number | Downlink sub-frame index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | | | | 4, 7 | 6, 7 | | | |
| 1 | | 6 | | | 4 | | 6 | | | 4 |
| 2 | | | 4 | | | | | 4 | 4 | |
| 3 | 4 | | | | | | | 4 | 4 | |
| 4 | | | | | | | | | 4 | 4 |
| 5 | | | | | | 4 | | | | |
| 6 | 7 | 7 | | | | 7 | 7 | | | 5 |

For the timing relationship from the PHICH to the PUSCH, in LTE and LTE-A, a PHICH resources block is independently assigned for the PUSCH within each uplink sub-frame. It is assumed that the UE receives the PHICH within a downlink sub-frame n, and the PHICH is used for controlling the PUSCH within an uplink sub-frame n+j. Values of j are defined in Table 3. Specifically, for TDD Uplink/Downlink Configurations 1 to 6, the number of the uplink sub-frames is less than or equal to the number of the downlink sub-frames, and for a certain downlink sub-frame n, a unique PUSCH timing relationship may be configured by a unique value of j, which is reflected in Table 3. Here, the PHICH resources block may not be configured within a downlink sub-frame, or the PHICH resources block of only one uplink sub-frame may be configured, For the TDD Uplink/Downlink Configuration 0, the number of the uplink sub-frames is greater than the number of the downlink sub-frames, so that the value of j could not be unique, wherein two PHICH resources blocks are configured within a downlink sub-frame 0 and a downlink sub-frame 5, i.e., PHICH resources block 0 and PHICH resources block 1, different j values are used for different PHICH resources. For example, when the UE receives the PHICH within a downlink sub-frame 0, the PUSCH within the uplink sub-frame 4 and/or uplink sub-frame 7 may be triggered. Table 3 showing a timing relationship from the PHICH to the PUSCH is provided below.

TABLE 3

| Configuration serial number | Downlink sub-frame index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 7 | | | | 4, 7 | 7 | | | |
| 1 | | 6 | | | 4 | | 6 | | | 4 |
| 2 | | | 4 | | | | | 4 | | |
| 3 | 4 | | | | | | | 4 | 4 | |
| 4 | | | | | | | | | 4 | 4 |
| 5 | | | | | | 4 | | | | |
| 6 | 7 | 7 | | | | 7 | 7 | | | 5 |

Secondly, the timing relationship from the PUSCH to the PHICH in the LTE and LTE-A is introduced.

For TDD Uplink/Downlink Configurations 1 to 6, when the UE receives the PHICH within a downlink sub-frame n, the PHICH indicates HARQ-ACK information of the PUSCH within an uplink sub-frame n-h. Values of h are shown in Table 4.

For TDD Uplink/Downlink Configuration 0, as two PHICH resources blocks are configured, when the UE receives the PHICH at the PHICH resources block 0 within the downlink sub-frame n, the PHICH may control the PUSCH within the uplink sub-frame n-h in accordance with the definition of h in Table 4. When the UE receives the PHICH at the PHICH resources block 1 within the downlink sub-frame 0 or the downlink sub-frame 5, the PHICH controls the PUSCH transmission within the uplink sub-frame n-6. Table 4 showing a timing relationship from the PUSCH to the PHICH is provided below

TABLE 4

| Uplink/Downlink Configuration | Downlink sub-frame index n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

According to Table 2, Table 3 and Table 4 of the timing relationship, a PUSCH timing relationship may be determined when a Cell adopts a particular TDD Uplink/Downlink Configuration, so that the PUSCH transmission may be achieved according to the PUSCH timing relationship.

However, with the requirements of users on data transfer rate becoming higher and higher, LTE-A technology is also proposed. In LTE-A, a greater bandwidth is capable through a combination of a plurality of Component Carriers (CC), and this technique is referred to as Carrier Aggregation (CA). For example, a 100 MHz bandwidth may be obtained through the combination of five 20 MHz CCs. Here, each CC is referred to as a Cell. The base station may configure a UE to work in more than one Cell, in which a Cell is known as the Primary Cell (PCell), and other Cells are known as the Secondary Cell (SCell).

For the TDD system using CA, through making the plurality of Cells in one combination using the same Uplink/Downlink Configuration, the PUSCH timing relationship configured for one Cell in LTE may be fully reused.

In addition, two scheduling policies are also defined in LTE-A, the first policy is cross-carrier scheduling, and the second policy is non-cross-carrier scheduling. The cross-carrier scheduling indicates that a Physical Downlink Shared CHannel (PDSCH) data transmission in one Cell is scheduled by the PDCCH sent by another Cell. The non-cross-carrier scheduling indicates that the PDSCH data transmission in one Cell is scheduled by the PDCCH sent by the Cell itself.

While for the condition that the TDD Uplink/Downlink Configurations of the Carrier Aggregated Cells are exactly the same, the cross-carrier scheduling may fully reuse the PUSCH timing relationship in the non-cross-carrier scheduling, as described below with reference to FIG. 2.

FIG. 2 is a schematic diagram illustrating the cross-carrier scheduling and the non-cross-carrier scheduling according to the related art.

Referring to FIG. 2, Cell 1 and Cell 2 all adopt TDD Uplink/Downlink Configuration 1. For the non-cross-carrier scheduling, in Cell 2, the UE receives PUSCH data of Cell 2 scheduled by the UL Grant. For the cross-carrier scheduling, in Cell 1, the UE receives the PUSCH data of Cell 2 scheduled by the UL Grant.

It can be seen that, in the TDD system using CA, under the circumstance that the TDD Uplink/Downlink Configurations of the Carrier Aggregated Cells are exactly the same, either in the cross-carrier scheduling or in the non-cross-carrier scheduling, the PUSCH timing relationship may reuse the PUSCH timing relationship in the above-mentioned TDD system which does not adopt CA, without modifying the protocol.

In LTE, there is an advantage of reducing adjacent channel interference when Uplink/Downlink Configurations of the Carrier Aggregated Cells are not exactly the same. Thus, an important topic for LTE-A is how to achieve the PUSCH transmission under the circumstance that the TDD Uplink/Downlink Configurations of the Carrier Aggregated Cells are different.

Obviously, for the circumstance that the Uplink/Downlink Configurations of Carrier Aggregated Cells are not exactly the same, the PUSCH timing relationship could not be simply fully-reused; thus there is a need for a solution on this issue.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for transmitting/receiving a Physical Uplink Shared CHannel (PUSCH) signal in cellular radio communication system supporting a Carrier Aggregation (CA) scheme.

Another aspect of the present invention is to provide an apparatus and method for transmitting/receiving a PUSCH signal based on an UpLink (UL)/DownLink (DL) Configuration in cellular radio communication system supporting a CA scheme.

Another aspect of the present invention is to provide an apparatus and method for transmitting/receiving a PUSCH signal by considering a Time Division Duplexing (TDD) scheme in cellular radio communication system supporting a CA scheme.

Another aspect of the present invention is to provide an apparatus and method for transmitting/receiving a PUSCH signal by considering a primary cell or a secondary cell in cellular radio communication system supporting a CA scheme.

In accordance with an aspect of the present invention, a method for transmitting a PUSCH signal by a User Equipment (UE) in a cellular radio communication system supporting a CA scheme is provided. The method includes transmitting a PUSCH signal to a Base Station (BS) based on a UL/DL Configuration, wherein, for a TDD scheme, if the UE is configured with more than one serving cell, UL/DL Configurations of at least two serving cells are different, and a serving cell is one of a primary cell and a secondary cell, a UL/DL Configuration for the serving cell is set as a UL-reference UL/DL Configuration based on a pair formed by a UL/DL Configuration for another serving cell and the UL/DL Configuration for the serving cell.

In accordance with another aspect of the present invention, method for method for transmitting a Physical Downlink Control CHannel (PDCCH) signal by a BS in a cellular radio communication system supporting a CA scheme is provided. The method includes transmitting a PDCCH signal including UL/DL Configuration as information related to a PUSCH signal transmission for a UE to the UE, wherein, for a TDD scheme, if the UE is configured with more than one serving cell, UL/DL Configurations of at least two serving cells are different, and a serving cell is one of a primary cell and a secondary cell, a UL/DL Configuration for the serving cell is set as a UL-reference UL/DL Configuration based on a pair formed by a UL/DL Configuration for another serving cell and the UL/DL Configuration for the serving cell.

In accordance with another aspect of the present invention, a UE in a cellular radio communication system supporting a CA scheme is provided. The UE includes a transmitter for transmitting a PUSCH signal to a BS based on a UL/DL Configuration, wherein, for a TDD scheme, if the UE is configured with more than one serving cell, UL/DL Configurations of at least two serving cells are different, and a serving cell is one of a primary cell and a secondary cell, a UL/DL Configuration for the serving cell is set as a UL-reference UL/DL Configuration based on a pair formed by a UL/DL Configuration for another serving cell and the UL/DL Configuration for the serving cell.

In accordance with another aspect of the present invention, a BS in a cellular radio communication system supporting a CA scheme is provided. The BS includes a transmitter for transmitting a PDCCH signal including UL/DL Configuration as information related to a PUSCH signal transmission for a UE to the UE, wherein, for a TDD scheme, if the UE is configured with more than one serving cell, UL/DL Configurations of at least two serving cells are different, and a serving cell is one of a primary cell and a secondary cell, a UL/DL Configuration for the serving cell is set as a UL-reference UL/DL Configuration based on a pair formed by a UL/DL Configuration for another serving cell and the UL/DL Configuration for the serving cell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
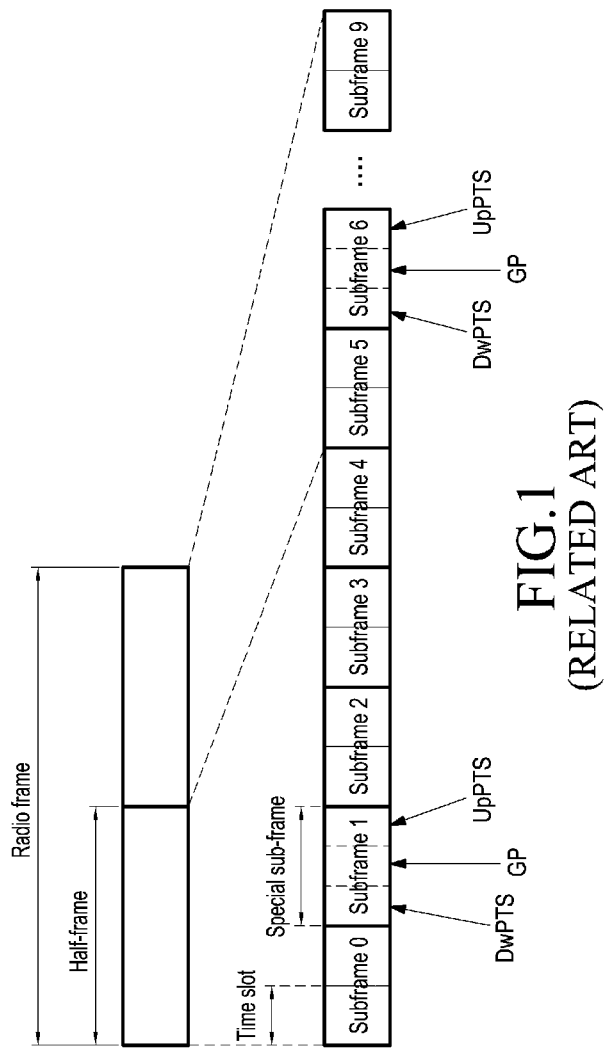
FIG. 1 is a schematic diagram illustrating a frame structure of a Long Term Evolution (LTE) Time Division Duplexing (TDD) system according to the related art.
Figure 2:
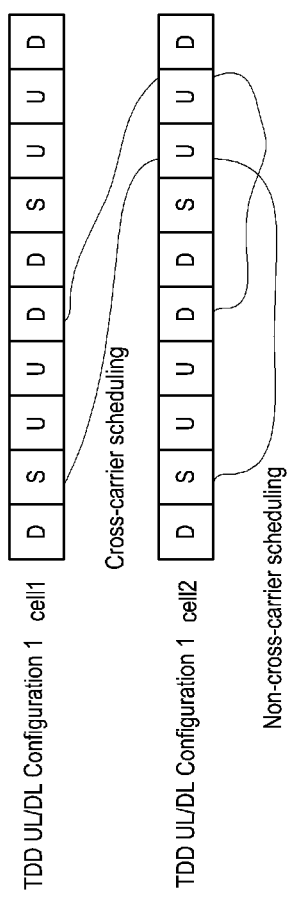
FIG. 2 is a schematic diagram illustrating a cross-carrier scheduling and a non-cross-carrier scheduling according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary embodiment of the present invention proposes an apparatus and method for transmitting/receiving a Physical Uplink Shared CHannel (PUSCH) signal in cellular radio communication system supporting a Carrier Aggregation (CA) scheme.

Another exemplary embodiment of the present invention proposes an apparatus and method for transmitting/receiving a PUSCH signal based on an UpLink (UL)/DownLink Configuration in cellular radio communication system supporting a CA scheme.

Another exemplary embodiment of the present invention proposes an apparatus and method for transmitting/receiving a PUSCH signal by considering a Time Division Duplexing (TDD) scheme in cellular radio communication system supporting a CA scheme.

Another exemplary embodiment of the present invention proposes an apparatus and method for transmitting/receiving a PUSCH signal by considering a Primary Cell (PCell) or a Secondary Cell (SCell) in cellular radio communication system supporting a CA scheme.

Exemplary embodiments of the present invention will be described below with reference to a Long Term Evolution Advanced (LTE-A) mobile communication system. However, it will be understood by those of ordinary skill in the art that exemplary embodiments of the present invention may be applied to any one of a High Speed Downlink Packet Access (HSDPA) mobile communication system, a High Speed Uplink Packet Access (HSUPA) mobile communication system, a Long-Term Evolution (LTE) mobile communication system, a High Rate Packet Data (HRPD) mobile communication system proposed in a 3rd Generation Project Partnership 2 (3GPP2), an Institute of Electrical and Electronics Engineers (IEEE) 802.16m mobile communication system, etc.

For convenience, it will be assumed that the LTE-A mobile communication system provides a service to a User Equipment (UE) using a CA scheme.

Exemplary embodiments of the present invention are hereinafter described in detail with reference to accompanying drawings, so as to make the aspects, technical solution and merits of the present invention more apparent.

Exemplary embodiments of the present invention mainly focus on a circumstance that TDD Uplink/Downlink Configurations of Carrier Aggregated Cells are not exactly the same in a TDD system using CA (for example, among three Cells, the Uplink/Downlink Configurations of two Cells are the same and are different from that of another Cell). At this time, the UE will work in one Cell or more than one Cell (all or parts of Cells in the CA).

In addition, two transmission modes are also defined in LTE-A, the first is full-duplex transmission mode, and the second is half-duplex transmission mode. The full-duplex transmission mode indicates that for different Cells in a sub-frame, some Cells are uplink sub-frames, and some Cells are downlink sub-frames, and the uplink sub-frames and the downlink sub-frames may be transmitted simultaneously. The half-duplex transmission mode indicates that for different Cells in a sub-frame, some Cells are uplink sub-frames, and some Cells are downlink sub-frames, and the uplink sub-frames and the downlink sub-frames may not be transmitted simultaneously, namely, either the uplink sub-frames are transmitted in this sub-frame and the downlink sub-frames are not transmitted, or the downlink sub-frames are transmitted in this sub-frame and the uplink sub-frames are not transmitted.

Therefore, under the circumstance that TDD Uplink/Downlink Configurations of Carrier Aggregated Cells are not exactly the same in the TDD system using the CA, in order to achieve PUSCH transmission, it is considered not only whether it is cross-carrier scheduling or not, but also whether the full-duplex transmission mode or the half-duplex transmission mode is adopted. Specific scenarios are as follows.

For a full-duplex UE, if it is the non-cross-carrier scheduling, the PUSCH within a sub-frame in a Cell is scheduled by a Physical Downlink Control CHannel (PDCCH) and Physical Hybrid Automatic Repeat reQuest (HARQ) Indicator CHannel (PHICH) within the downlink sub-frame of the Cell itself, so that this Cell may achieve the PUSCH transmission according to the PUSCH timing relationship configured for a Cell having an identical TDD Uplink/Downlink Configuration in the LTE and LTE-A of the related art.

For a full-duplex UE, if it is the cross-carrier scheduling, a Cell sending the PDCCH and PHICH is referred to as a Scheduling Cell in the present disclosure, and usually the Scheduling Cell is a PCell. A Cell sending the PUSCH is referred to as a Scheduled Cell, and usually the Scheduled Cell is a SCell. When the Uplink/Downlink Configuration of the Scheduling Cell is the same as the one of the Scheduled Cell, the PUSCH transmission may be achieved according to the PUSCH timing relationship configured for a Cell having an identical TDD Uplink/Downlink Configuration in the LTE and LTE-A of the related art, and the first PUSCH data transmission and the first data retransmission of this Cell are in the same HARQ-ACKnowledgement (ACK) process of this Cell. However, when the Uplink/Downlink Configuration of the Scheduling Cell is different from the one of the Scheduled Cell, the PUSCH transmission may not be achieved according to the configuration method of the PUSCH timing relationship in the LTE and LTE-A of the related art.

For a half-duplex UE, if transmission directions of sub-frames of the PCell and SCell in a certain position are different, namely, a Cell is an uplink sub-frame, and the other Cell is a downlink sub-frame (vice versa), then the sub-frame of the SCell is not transmitted and only the sub-frame of the PCell is transmitted. Therefore, the PUSCH transmission may not be achieved according to the configuration method of the PUSCH timing relationship in the LTE and LTE-A of the related art, neither in non-cross-carrier scheduling nor in cross-carrier scheduling of the half-duplex UE.

For the above situations, an exemplary embodiment of the present invention provides a method for transmitting the PUSCH, as described below with reference to FIG. 3.

Figure 3:
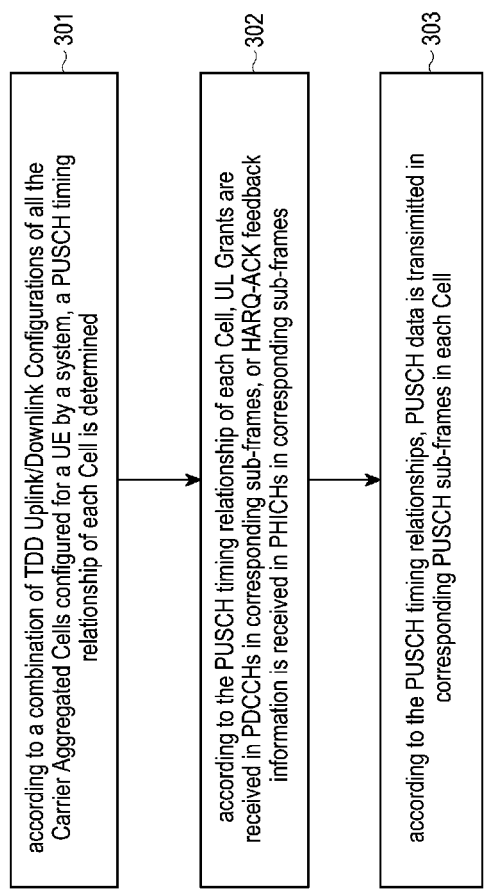
FIG. 3 is a flowchart illustrating a method for transmitting a Physical Uplink Shared CHannel (PUSCH) according to an exemplary embodiment of the present invention.

FIG. 3 is a flowchart illustrating a method for transmitting a PUSCH according to an exemplary embodiment of the present invention.

Referring to FIG. 3, in step 301, according to a combination of TDD Uplink/Downlink Configurations of all of the Carrier Aggregated Cells configured for a UE by a system, a PUSCH timing relationship of each Cell is determined.

In step 302, according to the PUSCH timing relationship of each Cell, UL Grants are received in PDCCHs in corresponding sub-frames, or HARQ-ACK feedback information is received in PHICHs of in corresponding sub-frames.

In step 303, PUSCH data is transmitted in corresponding PUSCH sub-frames in each Cell according to the PUSCH timing relationships.

The PUSCH timing relationships described in step 301 include a timing relationship between UL Grant and PUSCH, a timing relationship between PUSCH and PHICH, and a timing relationship between PHICH and PUSCH. In protocols of the related art, each one of seven TDD Uplink/Downlink Configurations corresponds to a PUSCH timing relationship (see Table 2, Table 3 and Table 4). For the circumstance that the TDD Uplink/Downlink Configurations of the Carrier Aggregated Cells are the same, if the TDD Uplink/Downlink Configuration of the PCell in CA is determined, then the PUSCH timing relationships on all Cells may be determined.

While in step 301, for each Cell, a PUSCH timing relationship should be selected, corresponding to one of the TDD Uplink/Downlink Configurations, to be determined as the PUSCH timing relationship of this Cell according to the combination of TDD Uplink/Downlink Configurations of all of the Carrier Aggregated Cells configured for the UE by the system. An example of this method is described below.

1. Under the Circumstance that Cross-Carrier Scheduling is Employed and the UE is Full-Duplex.

The cross-carrier scheduling indicates that a Cell receiving UL Grants or HARQ-ACK from the PDCCH by a terminal is different from a Cell sending the PUSCH data. The Cell receiving UL Grants or HARQ-ACK is referred to as a Scheduling Cell, while the Cell sending the PUSCH data is referred to as a Scheduled Cell. Furthermore, the Scheduling Cell may either be a PCell or a SCell that the TDD Uplink/Downlink Configuration of the SCell is different from the one of the Scheduled Cell but is the same as the one of the PCell. Here, the Scheduled Cell is the SCell.

Under this circumstance, for the Scheduling Cell, the PUSCH timing relationship corresponding to the TDD Uplink/Downlink Configuration of the Scheduling Cell is determined as the PUSCH timing relationship of the Scheduling Cell.

For the Scheduled Cell, as an example 1-1, a PUSCH timing relationship may be selected, corresponding to one of seven TDD Uplink/Downlink Configurations defined in protocols of the related art, to be taken as the PUSCH timing relationship of the Scheduled Cell according to the following regulations.

The selection condition to be met first is condition 1.

If the Scheduled Cell is one of TDD Uplink/Downlink Configurations 1, 2, 3, 4 or 5, for cross-carrier scheduled PUSCHs having the same HARQ Process IDentifier (ID), the serial numbers of sub-frames where PUSCH transmissions are located are the same. If the Scheduled Cell is one of the TDD Uplink/Downlink Configurations 0 or 6, for the cross-carrier scheduled PUSCHs having the same HARQ Process ID, the serial numbers of the sub-frames where the PUSCH transmission locate may be different, or may be the same.

The reasons for needing to meet the above condition 1 are that, in accordance with the provisions of the protocols of the related art, in Uplink/Downlink Configurations 1, 2, 3, 4 and 5, a corresponding relationship between an uplink PUSCH of a HARQ Process ID and an uplink sub-frame used to transmit the PUSCH is not changed with the change of serial numbers of the Radio frames in a continuous data transfer process. Moreover, in each PDCCH scheduling, a time interval between the downlink sub-frame where the UL Grant being transmitted in the PDCCH corresponding to the PUSCH locates and the uplink sub-frame where the PUSCH transmission locates should be greater than or equal to 4 ms.

Because in a Cell of one of Uplink/Downlink Configurations 1, 2, 3, 4 or 5, a legacy UE and a UE supporting the cross-carrier scheduling may exist simultaneously. If it could not ensure that the positions of sub-frames where each UE's PUSCHs having the same HARQ Process ID locations in a continuous data transfer process are the same, for example, if it is scheduled by the UE supporting the cross-carrier scheduling according to the PUSCH timing relationships corresponding to one of the Uplink/Downlink Configurations 0 or 6, then it could not ensure that a time interval between an uplink sub-frame where the PUSCH of each HARQ Process ID of all UEs is located and a PDCCH uplink indication (if it is PDCCH scheduling) corresponding to the uplink sub-frame may be greater than or equal to 4 ms. However, if the condition 1 is met, then it may be compatible with the protocols of the related art, and may not break restrictions for the time interval described in the protocols of the related art, and it does not need to modify the protocols of the related art either.

On the basis of meeting the above condition 1, another condition 2 needing to be met is that the largest number of uplink sub-frames may be scheduled according to the PUSCH timing relationship corresponding to the selected TDD Uplink/Downlink Configuration. The met condition 2 may ensure that the PUSCHs of the largest number of the uplink sub-frames may be scheduled, so that an uplink peak throughput of the UE is improved.

In the method of the present exemplary embodiment, on the basis of meeting the above condition 1, the candidate TDD Uplink/Downlink Configuration meeting the above condition 2 simultaneously may not be unique. At this time, in accordance with one implementation, a PUSCH timing relationship corresponding to the TDD Uplink/Downlink Configuration is selected as the PUSCH timing relationship of the Scheduled Cell according to the following priority.

When the number of the uplink sub-frames can be scheduled is the same, a priority of the PUSCH timing relationship corresponding to the Scheduling Cell TDD Configuration>a priority of the PUSCH timing relationship corresponding to the Scheduled Cell TDD Configuration>the PUSCH timing relationships corresponding to other TDD Configurations.

The above priority is just one implementation, and other priority implementations are within the scope of the present invention.

In accordance with the above method, for different circumstances about the TDD Uplink/Downlink Configuration of the Scheduled Cell, the method of the present exemplary embodiment may be further described as follows.

If the Uplink/Downlink Configuration of the Scheduled Cell is Uplink/Downlink Configuration 0, then the PUSCH timing relationship corresponding to the Uplink/Downlink Configuration 0 is taken as the PUSCH timing relationship of the Scheduled Cell.

If the Uplink/Downlink Configuration of the Scheduled Cell is Uplink/Downlink Configuration 6, and the Uplink/Downlink Configuration of the Scheduling Cell is the Uplink/Downlink Configuration other than the Uplink/Downlink Configuration 0, then the PUSCH timing relationship corresponding to the Uplink/Downlink Configuration 6 is taken as the PUSCH timing relationship of the Scheduled Cell.

If the Uplink/Downlink Configuration of the Scheduled Cell is the Uplink/Downlink Configuration other than the Uplink/Downlink Configurations 0 and 6, i.e., one of Uplink/Downlink Configurations 1, 2, 3, 4 or 5, then the PUSCH timing relationship of the Scheduled Cell is searched for according to the following regulations:

a) based on the number and positions of the downlink frames of the Scheduling Cell, a PUSCH timing relationship corresponding to an Uplink/Downlink Configuration is searched for among the Uplink/Downlink Configurations 1, 2, 3, 4 or 5, according to which the largest number of the uplink sub-frames could be scheduled, and is taken as the PUSCH timing relationship of the Scheduled Cell;

b) if there are a variety of PUSCH timing relationships meeting the condition a), which include the PUSCH timing relationship of the Scheduling Cell, then the PUSCH timing relationship of the Scheduling Cell is selected in priority; and c) if there are a variety of PUSCH timing relationships meeting the condition a), which do not include the PUSCH timing relationship of the Scheduling Cell but include the PUSCH timing relationship of the Scheduled Cell, then the PUSCH timing relationship of the Scheduled Cell is selected in priority.

If the Uplink/Downlink Configuration of the Scheduled Cell is Uplink/Downlink Configuration 6, and the Uplink/Downlink Configuration of the Scheduling Cell is Uplink/Downlink Configuration 0, one implementation is to use the PUSCH timing relationship corresponding to the Uplink/Downlink Configuration 0 (an implementation A). Another implementation is to use the PUSCH timing relationship corresponding to the Uplink/Downlink Configuration 6 (an implementation B).

In accordance with the above method, for different circumstances about the TDD Uplink/Downlink Configuration of the Scheduled Cell, the TDD Uplink/Downlink Configurations corresponding to the selected PUSCH timing relationships are shown in Table 5 (corresponding to implementation A) or Table 6 (corresponding to implementation B).

Selection Table 5 (corresponding to the implementation A) of the PUSCH timing relationship of the Scheduled Cell in accordance with example 1-1 under full-duplex cross-carrier scheduling is shown below.

TABLE 5

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 0 | 0 | 0 | 0 | 0 | 0 |
| 1 | 1 | 1 | 1 | 1 | 1 | 1 | 1 |
| 2 | 1 | 1 | 2 | 1 | 1 | 2 | 1 |
| 3 | 3 | 1 | 3 | 3 | 3 | 3 | 3 |
| 4 | 1 | 1 | 4 | 3 | 4 | 4 | 1 |
| 5 | 1 | 1 | 2 | 3 | 4 | 5 | 1 |
| 6 | 0 | 6 | 6 | 6 | 6 | 6 | 6 |

Selection Table 6 (corresponding to the implementation B) of the PUSCH timing relationship of the Scheduled Cell in accordance with example 1-1 under full-duplex cross-carrier scheduling is shown below.

TABLE 6

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 0 | 0 | 0 | 0 | 0 | 0 |
| 1 | 1 | 1 | 1 | 1 | 1 | 1 | 1 |
| 2 | 1 | 1 | 2 | 1 | 1 | 2 | 1 |
| 3 | 3 | 1 | 3 | 3 | 3 | 3 | 3 |
| 4 | 1 | 1 | 4 | 3 | 4 | 4 | 1 |
| 5 | 1 | 1 | 2 | 3 | 4 | 5 | 1 |
| 6 | 6 | 6 | 6 | 6 | 6 | 6 | 6 |

For example, if the Scheduling Cell is Uplink/Downlink Configuration 2, and the Scheduled Cell is Uplink/Downlink Configuration 1, then four uplink frames of the Scheduled Cell could be scheduled according to PUSCH timing relationship of the Uplink/Downlink Configuration 1, while two uplink sub-frames could be scheduled according to any one of PUSCH timing relationships of the Uplink/Downlink Configurations 2, 3 and 4, and one uplink sub-frame could be scheduled according to PUSCH timing relationship of the Uplink/Downlink Configuration 5, so that the PUSCH timing relationship corresponding to the Uplink/Downlink Configuration 1 is used as the PUSCH timing relationship of the Scheduled Cell.

Figure 4:
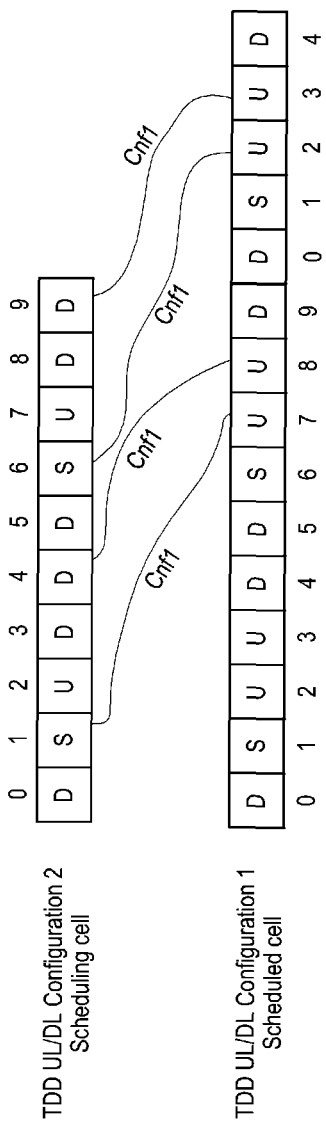
FIG. 4 is a schematic diagram illustrating that an Uplink/Downlink Configuration 2 schedules an Uplink/Downlink Configuration 1 through a PUSCH timing relationship of the Uplink/Downlink Configuration 1 according to an exemplary embodiment of the present invention.

FIG. 4 is a schematic diagram illustrating that an Uplink/Downlink Configuration 2 schedules an Uplink/Downlink Configuration 1 through a PUSCH timing relationship of the Uplink/Downlink Configuration 1 according to an exemplary embodiment of the present invention.

Referring to FIG. 4, an arrow with "Cnf1" represents that it is scheduled according to the PUSCH timing relationship of the Uplink/Downlink Configuration 1.

If the Scheduling Cell is Uplink/Downlink Configuration 1, and the Scheduled Cell is Uplink/Downlink Configuration 3, then two uplink frames could be scheduled according to any one of PUSCH timing relationships corresponding to the Uplink/Downlink Configurations 1 and 3, under this circumstance the PUSCH timing relationship corresponding to the Uplink/Downlink Configuration of the Scheduling Cell is selected in priority, so that the PUSCH timing relationship corresponding to the Uplink/Downlink Configuration 1 is selected as the PUSCH timing relationship of the Scheduled Cell.

Figure 5:
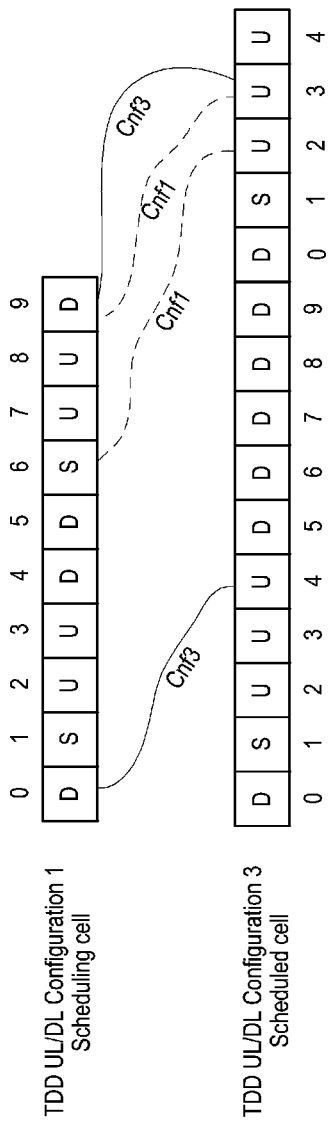
FIG. 5 is a schematic diagram illustrating that an Uplink/Downlink Configuration 1 schedules an Uplink/Downlink Configuration 3 through PUSCH timing relationships of the Uplink/Downlink Configurations 1 and 3 according to an exemplary embodiment of the present invention.

FIG. 5 is a schematic diagram illustrating that an Uplink/Downlink Configuration 1 schedules an Uplink/Downlink Configuration 3 through PUSCH timing relationships of the Uplink/Downlink Configurations 1 and 3 according to an exemplary embodiment of the present invention.

Referring to FIG. 5, an arrow with "Cnf3" represents that it is scheduled according to the PUSCH timing relationship of the Uplink/Downlink Configuration 3, an arrow with "Cnf1" represents that it is scheduled according to the PUSCH timing relationship of the Uplink/Downlink Configuration 1.

Figure 6:
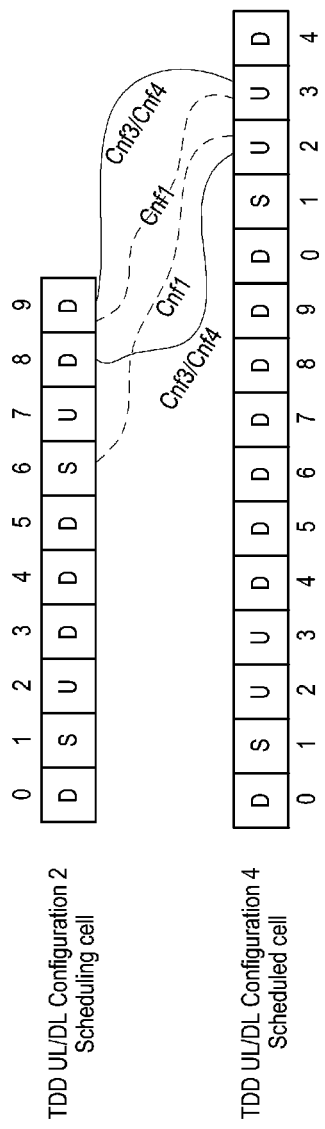
FIG. 6 is a schematic diagram illustrating that an Uplink/Downlink Configuration 2 schedules an Uplink/Downlink Configuration 4 through PUSCH timing relationships of the Uplink/Downlink Configurations 1, 3 and 4 according to an exemplary embodiment of the present invention.

If the Scheduling Cell is Uplink/Downlink Configuration 2, and the Scheduled Cell is Uplink/Downlink Configuration 4, then two uplink sub-frames of the Scheduled Cell could be scheduled according to any one of the PUSCH timing relationships of the Uplink/Downlink Configurations 1, 3 and 4, while one uplink sub-frame could be scheduled according to PUSCH timing relationship corresponding to the Uplink/Downlink Configurations 2, and the Scheduled Cell is Uplink/Downlink Configuration 4, so that the PUSCH timing relationship corresponding to the Uplink/Downlink Configuration 4 is used as the PUSCH timing relationship of the Scheduled Cell, as shown in FIG. 6.

FIG. 6 is a schematic diagram illustrating that an Uplink/Downlink Configuration 2 schedules an Uplink/Downlink Configuration 4 through PUSCH timing relationships of the Uplink/Downlink Configurations 1, 3 and 4 according to an exemplary embodiment of the present invention.

In addition, under the circumstance that cross-carrier scheduling is employed and the UE is full-duplex, for the Scheduled Cell, other implementations may be used as follows.

As an example 1-2, a PUSCH timing relationship may be selected, among PUSCH timing relationships corresponding to seven TDD Uplink/Downlink Configurations defined in the protocols of the related art, to be taken as the PUSCH timing relationship of the Scheduled Cell according to the following regulations.

In the example 1-2, a selection condition needing to be met first is the same as the condition 1 in the example 1-1, which is not repeated here. The difference is that, on the basis of meeting the above condition 1, it does not need to meet the condition 2, while the following selection method is used.

A PUSCH timing relationship is selected from the PUSCH timing relationship corresponding to the TDD Uplink/Downlink Configuration of the Scheduling Cell and the PUSCH timing relationship corresponding to the TDD Uplink/Downlink Configuration of the Scheduled Cell, according to which the largest number of uplink sub-frames could be scheduled, and is taken as the PUSCH timing relationship of the PUSCH of the Scheduled Cell. If the number of the uplink sub-frames scheduled according to the PUSCH timing relationship corresponding to the TDD Uplink/Downlink Configuration of the Scheduling Cell is equal to the number of the uplink sub-frames scheduled according to the PUSCH timing relationship corresponding to the TDD Uplink/Downlink Configuration of the Scheduled Cell, then the PUSCH timing relationship corresponding to the TDD Uplink/Downlink Configuration of the Scheduling Cell is selected as the PUSCH timing relationship of the Scheduled Cell.

In accordance with the above method, for different circumstances about the TDD Uplink/Downlink Configuration of the Scheduled Cell, the method of the present exemplary embodiment may be further described as follows.

If the Uplink/Downlink Configuration of the Scheduled Cell is Uplink/Downlink Configuration 0, then the PUSCH timing relationship corresponding to the Uplink/Downlink Configuration 0 is used.

If the Uplink/Downlink Configuration of the Scheduled Cell is the Uplink/Downlink Configuration other than the Uplink/Downlink Configurations 0 and 6, i.e., one of Uplink/Downlink Configurations 1, 2, 3, 4 or 5, and the Uplink/Downlink Configuration of the Scheduling Cell is the Uplink/Downlink Configuration other than the Uplink/Downlink Configurations 0 and 6 also, then the PUSCH timing relationship is selected from the PUSCH timing relationship corresponding to the Uplink/Downlink Configuration of the Scheduling Cell and the PUSCH timing relationship corresponding to the Uplink/Downlink Configuration of the Scheduled Cell, according to which the largest number of uplink frames of the Scheduled Cell could be scheduled, and is taken as the PUSCH timing relationship of the Scheduled Cell. If the number of the uplink sub-frames scheduled by the Scheduling Cell is equal to the number of the uplink sub-frames scheduled by the Scheduled Cell, then the PUSCH timing relationship of the Scheduling Cell is selected in priority (or for other considerations, for example, in order to simplify a scheduling algorithm, the PUSCH timing relationship of a cross-carrier scheduling UE is set to be the same as the PUSCH timing relationship of a non-cross-carrier scheduling UE within a Scheduled Cell, then the PUSCH timing relationship of the Scheduled Cell is selected in priority, which also within the scope of the present invention).

If the Uplink/Downlink Configuration of the Scheduled Cell is Uplink/Downlink Configuration other than the Uplink/Downlink Configurations 0 and 6, i.e., any one of Uplink/Downlink Configurations 1, 2, 3, 4 or 5, and the Uplink/Downlink Configuration of the Scheduling Cell is one of Uplink/Downlink Configuration 0 or 6, then the PUSCH timing relationship of the Scheduled Cell is selected in priority. If the number of the uplink sub-frames scheduled by the Scheduled Cell is equal to zero, then the PUSCH timing relationship, according to which the largest number of uplink sub-frames can be scheduled, corresponding to an Uplink/Downlink Configuration selected among the Uplink/Downlink Configurations 1, 2, 3, 4 or 5, is taken as the PUSCH timing relationship of the Scheduled Cell (or for other considerations, for example, in order to simplify a technical scheme, the uplink sub-frames of the Scheduled Cell are not scheduled, which also within the scope of the present invention).

If the Uplink/Downlink Configuration of the Scheduled Cell is Uplink/Downlink Configuration 6, and the Uplink/Downlink Configuration of the Scheduling Cell is the Uplink/Downlink Configuration other than the Uplink/Downlink Configuration 0, then the PUSCH timing relationship corresponding to Uplink/Downlink Configuration 6 is used.

If the Uplink/Downlink Configuration of the Scheduled Cell is the Uplink/Downlink Configuration 6, and the Uplink/Downlink Configuration of the Scheduling Cell is the Uplink/Downlink Configuration 0, one implementation is to use the PUSCH timing relationship corresponding to the Uplink/Downlink Configuration 0 (an implementation A). Another implementation is to use the PUSCH timing relationship corresponding to the Uplink/Downlink Configuration 6 (an implementation B).

In accordance with the above method, for different circumstances about the TDD Uplink/Downlink Configuration of the Scheduled Cell, the TDD Uplink/Downlink Configurations corresponding to the selected PUSCH timing relationships are shown in Table 7 (corresponding to the implementation A) or Table 8 (corresponding to the implementation B).

Selection Table 7 (corresponding to the implementation A) of the PUSCH timing relationship of the Scheduled Cell in accordance with example 1-2 under full-duplex cross-carrier scheduling is shown below.

TABLE 7

| Uplink/Downlink Configuration of the Scheduled Cell | Uplink/Downlink Configuration of the Scheduling Cell | | | | | | |
|---|---|---|---|---|---|---|---|
|  | 0 | 1 | 2 | 3 | 4 | 5 | 6 |
| 0 | 0 | 0 | 0 | 0 | 0 | 0 | 0 |
| 1 | 1 | 1 | 1 | 1 | 1 | 1 | 1 |

TABLE 7-continued

| Uplink/Downlink Configuration of the Scheduled Cell | Uplink/Downlink Configuration of the Scheduling Cell | | | | | | |
|---|---|---|---|---|---|---|---|
|  | 0 | 1 | 2 | 3 | 4 | 5 | 6 |
| 2 | 1 | 1 | 2 | 3 | 4 | 2 | 1 |
| 3 | 3 | 1 | 3 | 3 | 3 | 3 | 3 |
| 4 | 1 | 1 | 4 | 3 | 4 | 4 | 4 |
| 5 | 1 | 1 | 2 | 3 | 4 | 5 | 1 |
| 6 | 0 | 6 | 6 | 6 | 6 | 6 | 6 |

Selection Table 8 (corresponding to the implementation B) of the PUSCH timing relationship of the Scheduled Cell in accordance with example 1-2 under full-duplex cross-carrier scheduling is shown below.

TABLE 8

| Uplink/Downlink Configuration of the Scheduled Cell | Uplink/Downlink Configuration of the Scheduling Cell | | | | | | |
|---|---|---|---|---|---|---|---|
|  | 0 | 1 | 2 | 3 | 4 | 5 | 6 |
| 0 | 0 | 0 | 0 | 0 | 0 | 0 | 0 |
| 1 | 1 | 1 | 1 | 1 | 1 | 1 | 1 |
| 2 | 1 | 1 | 2 | 3 | 4 | 2 | 1 |
| 3 | 3 | 1 | 3 | 3 | 3 | 3 | 3 |
| 4 | 1 | 1 | 4 | 3 | 4 | 4 | 4 |
| 5 | 1 | 1 | 2 | 3 | 4 | 5 | 1 |
| 6 | 6 | 6 | 6 | 6 | 6 | 6 | 6 |

Figure 7:
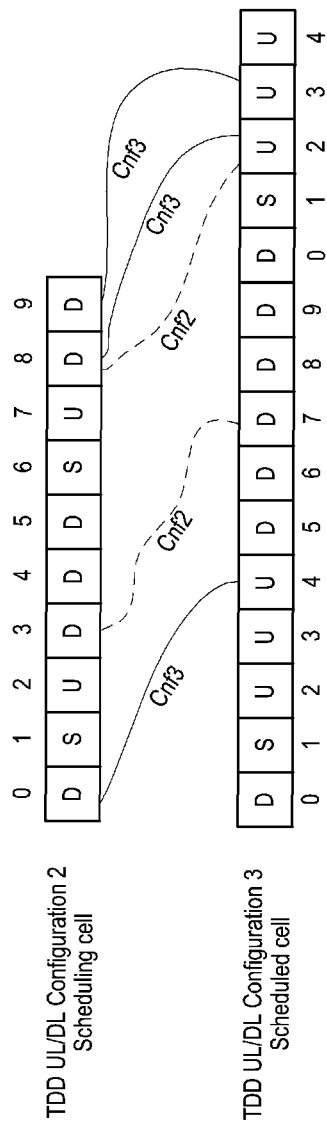
FIG. 7 is a schematic diagram illustrating that an Uplink/Downlink Configuration 2 schedules an Uplink/Downlink Configuration 3 through PUSCH timing relationships of the Uplink/Downlink Configurations 2 and 3 according to an exemplary embodiment of the present invention.

For example, if the Uplink/Downlink Configuration of the Scheduling Cell is Uplink/Downlink Configuration 2, and the Uplink/Downlink Configuration of the Scheduled Cell is Uplink/Downlink Configuration 3, then one uplink sub-frame could be scheduled according to the PUSCH timing relationship corresponding to the Uplink/Downlink Configuration of the Scheduling Cell, while three uplink sub-frames could be scheduled according to the PUSCH timing relationship corresponding to the Uplink/Downlink Configuration of the Scheduled Cell, so that the PUSCH timing relationship corresponding to the Uplink/Downlink Configuration of the Scheduled Cell is selected as the PUSCH timing relationship of the Scheduled Cell, as shown in FIG. 7.

FIG. 7 is a schematic diagram illustrating that an Uplink/Downlink Configuration 2 schedules an Uplink/Downlink Configuration 3 through PUSCH timing relationships of the Uplink/Downlink Configurations 2 and 3 according to an exemplary embodiment of the present invention.

Figure 8:
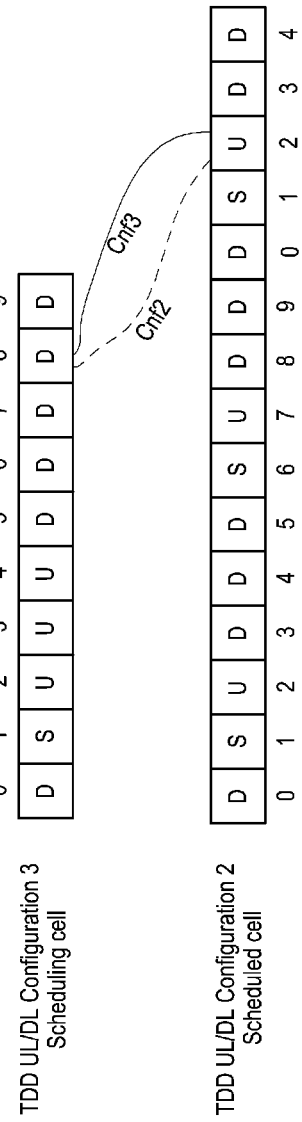
FIG. 8 is a schematic diagram illustrating that an Uplink/Downlink Configuration 3 schedules an Uplink/Downlink Configuration 2 through PUSCH timing relationships of the Uplink/Downlink Configurations 2 and 3 according to an exemplary embodiment of the present invention.

If the Uplink/Downlink Configuration of the Scheduling Cell is Uplink/Downlink Configuration 3, and the Uplink/Downlink Configuration of the Scheduled Cell is Uplink/Downlink Configuration 2, then only one uplink frame of the Scheduled Cell could be scheduled either according to the PUSCH timing relationship corresponding to the Uplink/Downlink Configuration of the Scheduling Cell or according to the PUSCH timing relationship corresponding to the Uplink/Downlink Configuration of the Scheduled Cell, so that the PUSCH timing relationship corresponding to the Uplink/Downlink Configuration of the Scheduling Cell is selected as the PUSCH timing relationship of the Scheduled Cell, as shown in FIG. 8.

FIG. 8 is a schematic diagram illustrating that an Uplink/Downlink Configuration 3 schedules an Uplink/Downlink Configuration 2 through PUSCH timing relationships of the Uplink/Downlink Configurations 2 and 3 according to an exemplary embodiment of the present invention.

Figure 9:
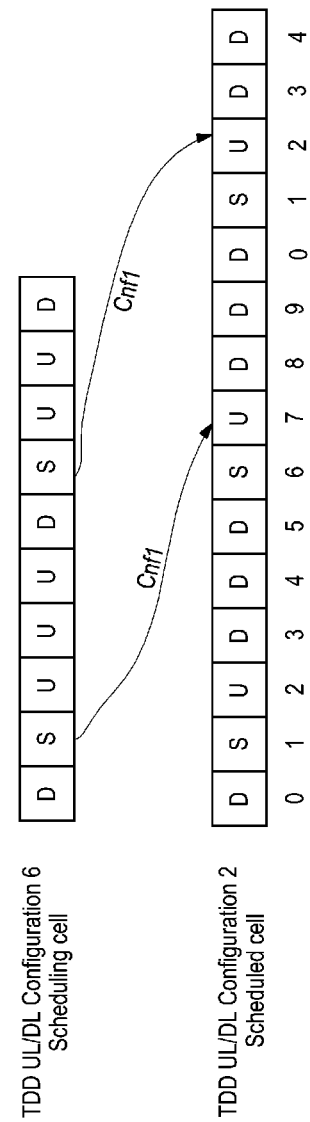
FIG. 9 is a schematic diagram illustrating that an Uplink/Downlink Configuration 6 schedules an Uplink/Downlink Configuration 2 through a PUSCH timing relationship of the Uplink/Downlink Configurations 1 according to an exemplary embodiment of the present invention.

If the Uplink/Downlink Configuration of the Scheduling Cell is Configuration 6, and the Uplink/Downlink Configuration of the Scheduled Cell is Configuration 2, then the number of uplink frames of the Scheduled Cell could be scheduled according to the PUSCH timing relationship corresponding to the Uplink/Downlink Configuration of the Scheduled Cell is zero, while two uplink frames of the Scheduled Cell could be scheduled according to the PUSCH timing relationship, corresponding to the Uplink/Downlink Configuration of the Configuration 1, which is the PUSCH timing relationship according to which the largest number of uplink frames could be scheduled, so that the PUSCH timing relationship of Configuration 1 is selected as the PUSCH timing relationship of the Scheduled Cell, as shown in FIG. 9.

FIG. 9 is a schematic diagram illustrating that an Uplink/Downlink Configuration 6 schedules an Uplink/Downlink Configuration 2 through a PUSCH timing relationship of the Uplink/Downlink Configurations 1 according to an exemplary embodiment of the present invention.

In addition, under the circumstance that cross-carrier scheduling is employed and the UE is full-duplex, in order to avoid the introduction or as little as possible of the introduction of e-PHICH, for a Scheduled Cell, another implementation may be used as follows.

As an example 1-3 of the present exemplary embodiment, a PUSCH timing relationship may be selected, among PUSCH timing relationships corresponding to seven TDD Uplink/Downlink Configurations defined in the protocols of the related art, to be taken as the PUSCH timing relationship of the Scheduled Cell according to the following regulations.

In the example 1-3, firstly, PUSCH timing relationships corresponding to several TDD Uplink/Downlink Configurations meeting the condition 1 in the example 1-1 and selected from the seven TDD Uplink/Downlink Configurations defined in the protocols of the related art are taken as candidate PUSCH timing relationships. The condition 1 in the example 1-1 is already described, and is not repeated here. After the candidate PUSCH timing relationships are selected, the following selection method is used for further selection.

When the Uplink/Downlink Configuration of the Scheduling Cell is one of Configuration 0 or Configuration 6, then it is scheduled via the PUSCH timing relationship selected in example 1-1 or example 1-2 (or for other considerations, for example, in order to simplify a technical scheme, the uplink sub-frames of the Scheduled Cell are not scheduled, which also within the scope of the present invention).

When the Uplink/Downlink Configuration of the Scheduling Cell is not Configuration 0 or Configuration 6, all uplink sub-frames of the Scheduled Cell are scheduled according to the PUSCH timing relationship corresponding to the TDD Uplink/Downlink Configuration of the Scheduling Cell in priority. The uplink sub-frames that could not be scheduled according to the PUSCH timing relationship corresponding to the TDD Uplink/Downlink Configuration of the Scheduling Cell are not scheduled or scheduled according to the PUSCH timing relationship selected in the example 1-1 or example 1-2. Specifically, for a particular sub-frame, if the Scheduling Cell and the Scheduled Cell are both the uplink sub-frames, then all uplink sub-frames of the Scheduled Cell are scheduled according to the PUSCH timing relationship corresponding to the TDD Uplink/Downlink Configuration of the Scheduling Cell. In other circumstances, all uplink sub-frames of the Scheduled Cell are not scheduled or scheduled according to the PUSCH timing relationship selected in the example 1-1 or example 1-2.

In accordance with the above method, for different circumstances about the TDD Uplink/Downlink Configuration of the Scheduling Cell, the method of the present exemplary embodiment may be further described as follows.

If the Uplink/Downlink Configuration of the Scheduling Cell is one of Uplink/Downlink Configurations 0 or 6, then corresponding PUSCH timing relationship selected from Table 5, Table 6, Table 7 or Table 8 is taken as the PUSCH timing relationship of the Scheduled Cell. For example, if the Scheduling Cell is 0 and the Scheduled Cell is 1, then the PUSCH timing relationship corresponding to a position where the Scheduling Cell is 0 and the Scheduled Cell is 1 in Table 5, Table 6, Table 7 or Table 8 is used (or for other considerations, for example, in order to simplify a technical scheme, the uplink sub-frames of the Scheduled Cell are not scheduled, which also within the scope of the present invention).

If the Uplink/Downlink Configuration of the Scheduling Cell is the Uplink/Downlink Configuration other than the Uplink/Downlink Configurations 0 and 6, i.e., any one of Uplink/Downlink Configurations 1, 2, 3, 4 or 5, for a particular sub-frame, if the Scheduling Cell and the Scheduled Cell are both the uplink sub-frames, then it is scheduled according to the PUSCH timing relationship corresponding to the TDD Uplink/Downlink Configuration of the Scheduling Cell. For uplink sub-frames on the Scheduled Cell that could not be scheduled by the PUSCH timing relationship of the Scheduling Cell, they are processed according to the following two implementations.

a) An implementation I: these uplink sub-frames are not scheduled.
b) An implementation II: if the Uplink/Downlink Configuration of the Scheduled Cell is one of Uplink/Downlink Configurations 0 or 6, then these uplink sub-frames are not scheduled. If the Uplink/Downlink Configuration of the Scheduled Cell is one of Uplink/Downlink Configurations 1, 2, 3, 4 or 5, then these uplink sub-frames are scheduled according to the corresponding PUSCH timing relationship selected from Table 5, Table 6, Table 7 or Table 8.

In accordance with the above method, for different circumstances about the TDD Uplink/Downlink Configuration of the Scheduling Cell, in accordance with examples 1-1 and 1-2, under the implementation I, the TDD Uplink/Downlink Configurations corresponding to the selected PUSCH timing relationships are shown in Table 9, Table 10, Table 11 and Table 12.

Selection Table 9 (corresponding to the implementation A in the example 1-1) of the PUSCH timing relationship of the Scheduled Cell in accordance with the implementation I in the example 1-3 under full-duplex cross-carrier scheduling is shown below.

TABLE 9

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 1 | 2 | 3 | 4 | 5 | 0 |
| 1 | 1 | 1 | 2 | 3 | 4 | 5 | 1 |

TABLE 9-continued

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 2 | 1 | 1 | 2 | 3 | 4 | 5 | 1 |
| 3 | 3 | 1 | 2 | 3 | 4 | 5 | 3 |
| 4 | 1 | 1 | 2 | 3 | 4 | 5 | 1 |
| 5 | 1 | 1 | 2 | 3 | 4 | 5 | 1 |
| 6 | 0 | 1 | 2 | 3 | 4 | 5 | 6 |

Selection Table 10 (corresponding to the implementation B in the example 1-1) of the PUSCH timing relationship of the Scheduled Cell in accordance with the implementation I in the example 1-3 under full-duplex cross-carrier scheduling is shown below.

TABLE 10

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 1 | 2 | 3 | 4 | 5 | 0 |
| 1 | 1 | 1 | 2 | 3 | 4 | 5 | 1 |
| 2 | 1 | 1 | 2 | 3 | 4 | 5 | 1 |
| 3 | 3 | 1 | 2 | 3 | 4 | 5 | 3 |
| 4 | 1 | 1 | 2 | 3 | 4 | 5 | 1 |
| 5 | 1 | 1 | 2 | 3 | 4 | 5 | 1 |
| 6 | 6 | 1 | 2 | 3 | 4 | 5 | 6 |

Selection Table 11 (corresponding to the implementation A in the example 1-2) of the PUSCH timing relationship of the Scheduled Cell in accordance with the implementation I in the example 1-3 under full-duplex cross-carrier scheduling is shown below.

TABLE 11

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 1 | 2 | 3 | 4 | 5 | 0 |
| 1 | 1 | 1 | 2 | 3 | 4 | 5 | 1 |
| 2 | 1 | 1 | 2 | 3 | 4 | 5 | 1 |
| 3 | 3 | 1 | 2 | 3 | 4 | 5 | 3 |
| 4 | 1 | 1 | 2 | 3 | 4 | 5 | 4 |
| 5 | 1 | 1 | 2 | 3 | 4 | 5 | 1 |
| 6 | 0 | 1 | 2 | 3 | 4 | 5 | 6 |

Selection Table 12 (corresponding to the implementation B in the example 1-2) of the PUSCH timing relationship of the Scheduled Cell in accordance with the implementation I in the example 1-3 under full-duplex cross-carrier scheduling is shown below.

TABLE 12

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 1 | 2 | 3 | 4 | 5 | 0 |
| 1 | 1 | 1 | 2 | 3 | 4 | 5 | 1 |
| 2 | 1 | 1 | 2 | 3 | 4 | 5 | 1 |
| 3 | 3 | 1 | 2 | 3 | 4 | 5 | 3 |
| 4 | 1 | 1 | 2 | 3 | 4 | 5 | 4 |
| 5 | 1 | 1 | 2 | 3 | 4 | 5 | 1 |
| 6 | 6 | 1 | 2 | 3 | 4 | 5 | 6 |

For example, if the Uplink/Downlink Configuration of the Scheduling Cell is Uplink/Downlink Configuration 2 and the Uplink/Downlink Configuration of the Scheduled Cell is Uplink/Downlink Configuration 1, an uplink sub-frame 2 and an uplink sub-frame 7 of the Scheduled Cell are scheduled according to the PUSCH timing relationship corresponding to the Uplink/Downlink Configurations 2. For an uplink sub-frame 3 and an uplink sub-frame 8 of the Scheduled Cell, they could not be scheduled according to the PUSCH timing relationship of the Uplink/Downlink Configurations 2. If the implementation I is employed, then these two uplink sub-frames are not scheduled. If the implementation II is employed, then these two uplink sub-frames are scheduled according to the PUSCH timing relationship corresponding to the Uplink/Downlink Configurations 1, as shown in FIG. 10.

Figure 10:
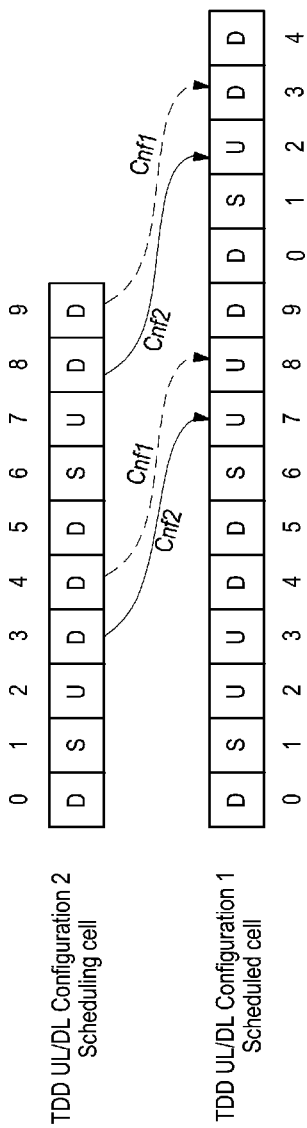
FIG. 10 is a schematic diagram illustrating that an Uplink/Downlink Configuration 2 schedules an Uplink/Downlink Configuration 1 through PUSCH timing relationships of the Uplink/Downlink Configurations 2 and 1 according to an exemplary embodiment of the present invention.

FIG. 10 is a schematic diagram illustrating that an Uplink/Downlink Configuration 2 schedules an Uplink/Downlink Configuration 1 through PUSCH timing relationships of the Uplink/Downlink Configurations 2 and 1 according to an exemplary embodiment of the present invention.

2. Under the Circumstance that Cross-Carrier Scheduling is Employed and the UE is Half-Duplex.

If uplink sub-frames of a PCell and a SCell in a certain position have different transmission directions, namely, a Cell is an uplink sub-frame and another Cell is a downlink sub-frame (or vice versa), then the sub-frame of the SCell is not sent, and only the sub-frame of the PCell is sent.

Under this circumstance, for the Scheduled Cell, for cross-carrier scheduling of the half-duplex UE, if the Scheduling Cell is a PCell, or the Scheduling Cell is a SCell on the same Frequency Band with the PCell, namely this SCell has the same Uplink/Downlink Configuration with the PCell, in accordance with the method of the present exemplary embodiment, the PUSCH timing relationship of the Scheduled Cell may be selected according to the following two implementations, namely example 2-1 and example 2-2.

Example 2-1

If the Scheduling Cell is the Uplink/Downlink Configuration other than the Uplink/Downlink Configurations 0 and 6, i.e., any one of Uplink/Downlink Configurations 1, 2, 3, 4 or 5, then the PUSCH timing relationship corresponding to the TDD Uplink/Downlink Configuration of the Scheduling Cell is selected as the PUSCH timing relationship of the Scheduled Cell.

If the Scheduling Cell is Uplink/Downlink Configuration 0 or Uplink/Downlink Configurations 6, the Scheduled Cell is the Uplink/Downlink Configuration other than the Uplink/Downlink Configurations 0 and 6, i.e., any one of Uplink/Downlink Configurations 1, 2, 3, 4 or 5, then the PUSCH timing relationship of a corresponding position in Table 5 is used, e.g., if the Scheduling Cell is TDD Uplink/Downlink Configuration 0, the Scheduled Cell is TDD Uplink/Downlink Configuration 1, then the PUSCH timing relationship corresponding to a position in Table 5 where the Scheduling Cell is TDD Uplink/Downlink Configuration 0 and the Scheduled Cell is TDD Uplink/Downlink Configuration 1 is used.

If the Scheduling Cell is the Uplink/Downlink Configuration 6, the Scheduled Cell is the Uplink/Downlink Configuration 0, and then the PUSCH timing relationship corresponding to the TDD Uplink/Downlink Configuration 6 is selected as the PUSCH timing relationship of the Scheduled Cell.

If the Scheduling Cell is the Uplink/Downlink Configuration 0, and the Scheduled Cell is the Uplink/Downlink Configuration 6, one implementation method (an implementation method A) is to select the PUSCH timing relationship corresponding to the Uplink/Downlink Configuration 0 as the PUSCH timing relationship of the Scheduled Cell. Another implementation method (an implementation method B) is to select the PUSCH timing relationship corresponding to the Uplink/Downlink Configuration 6 as the PUSCH timing relationship of the Scheduled Cell.

In accordance with the above example 2-1, under the circumstance that cross-carrier scheduling is employed and the UE is half-duplex, the TDD Uplink/Downlink Configurations corresponding to the selected PUSCH timing relationships in accordance with the implementation method A and the implementation method B are respectively shown in Table 13 and Table 14.

Selection Table 13 (corresponding to the implementation method A) of the PUSCH timing relationship of the Scheduled Cell in accordance with the example 2-1 under half-duplex cross-carrier scheduling is shown below.

TABLE 13

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 1 | 2 | 3 | 4 | 5 | 6 |
| 1 | 1 | 1 | 2 | 3 | 4 | 5 | 1 |
| 2 | 1 | 1 | 2 | 3 | 4 | 5 | 1 |
| 3 | 3 | 1 | 2 | 3 | 4 | 5 | 3 |
| 4 | 1 | 1 | 2 | 3 | 4 | 5 | 1 |
| 5 | 1 | 1 | 2 | 3 | 4 | 5 | 1 |
| 6 | 0 | 1 | 2 | 3 | 4 | 5 | 6 |

Selection Table 14 (corresponding to the implementation method B) of the PUSCH timing relationship of the Scheduled Cell in accordance with the example 2-1 under half-duplex cross-carrier scheduling is shown below.

TABLE 14

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 1 | 2 | 3 | 4 | 5 | 6 |
| 1 | 1 | 1 | 2 | 3 | 4 | 5 | 1 |
| 2 | 1 | 1 | 2 | 3 | 4 | 5 | 1 |
| 3 | 3 | 1 | 2 | 3 | 4 | 5 | 3 |
| 4 | 1 | 1 | 2 | 3 | 4 | 5 | 1 |
| 5 | 1 | 1 | 2 | 3 | 4 | 5 | 1 |
| 6 | 6 | 1 | 2 | 3 | 4 | 5 | 6 |

Example 2-2

If the Scheduling Cell is the Uplink/Downlink Configuration other than the Uplink/Downlink Configurations 0 and 6, i.e., any one of Uplink/Downlink Configurations 1, 2, 3, 4 or 5, then the PUSCH timing relationship corresponding to the TDD Uplink/Downlink Configuration of the Scheduling Cell is selected as the PUSCH timing relationship of the Scheduled Cell.

If the Scheduling Cell is Uplink/Downlink Configuration 0 or Uplink/Downlink Configurations 6, the Scheduled Cell is the Uplink/Downlink Configuration other than the Uplink/Downlink Configurations 0 and 6, i.e., any one of Uplink/Downlink Configurations 1, 2, 3, 4 or 5, then the PUSCH timing relationship of a corresponding position in Table 7 is used, e.g., if the Scheduling Cell is TDD Uplink/Downlink Configuration 0, the Scheduled Cell is TDD Uplink/Downlink Configuration 1, then the PUSCH timing relationship corresponding to a position in Table 7 where the Scheduling Cell is TDD Uplink/Downlink Configuration 0 and the Scheduled Cell is TDD Uplink/Downlink Configuration 1 is used.

If the Scheduling Cell is the Uplink/Downlink Configuration 6, the Scheduled Cell is the Uplink/Downlink Configuration 0, and then the PUSCH timing relationship corresponding to the TDD Uplink/Downlink Configuration 6 is selected as the PUSCH timing relationship of the Scheduled Cell.

If the Scheduling Cell is the Uplink/Downlink Configuration 0, and the Scheduled Cell is the Uplink/Downlink Configuration 6, one implementation method (an implementation method A) is to select the PUSCH timing relationship corresponding to the Uplink/Downlink Configuration 0 as the PUSCH timing relationship of the Scheduled Cell. Another implementation method (an implementation method B) is to select the PUSCH timing relationship corresponding to the Uplink/Downlink Configuration 6 as the PUSCH timing relationship of the Scheduled Cell.

In accordance with the above example 2-2, under the circumstance that cross-carrier scheduling is employed and the UE is half-duplex, the TDD Uplink/Downlink Configurations corresponding to the selected PUSCH timing relationships in accordance with the implementation method A and the implementation method B are respectively shown in Table 15 and Table 16.

Selection Table 15 (corresponding to the implementation method A) of the PUSCH timing relationship of the Scheduled Cell in accordance with the example 2-2 under half-duplex cross-carrier scheduling is shown below.

TABLE 15

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 1 | 2 | 3 | 4 | 5 | 6 |
| 1 | 1 | 1 | 2 | 3 | 4 | 5 | 1 |
| 2 | 1 | 1 | 2 | 3 | 4 | 5 | 1 |
| 3 | 3 | 1 | 2 | 3 | 4 | 5 | 3 |
| 4 | 1 | 1 | 2 | 3 | 4 | 5 | 4 |
| 5 | 1 | 1 | 2 | 3 | 4 | 5 | 1 |
| 6 | 0 | 1 | 2 | 3 | 4 | 5 | 6 |

Selection Table 16 (corresponding to the implementation method B) of the PUSCH timing relationship of the Scheduled Cell in accordance with the example 2-2 under half-duplex cross-carrier scheduling is shown below.

TABLE 16

| Uplink/Downlink Configuration of the Scheduled Cell | Uplink/Downlink Configuration of the Scheduling Cell | | | | | | |
|---|---|---|---|---|---|---|---|
| | 0 | 1 | 2 | 3 | 4 | 5 | 6 |
| 0 | 0 | 1 | 2 | 3 | 4 | 5 | 6 |
| 1 | 1 | 1 | 2 | 3 | 4 | 5 | 1 |
| 2 | 1 | 1 | 2 | 3 | 4 | 5 | 1 |
| 3 | 3 | 1 | 2 | 3 | 4 | 5 | 3 |
| 4 | 1 | 1 | 2 | 3 | 4 | 5 | 4 |
| 5 | 1 | 1 | 2 | 3 | 4 | 5 | 1 |
| 6 | 6 | 1 | 2 | 3 | 4 | 5 | 6 |

TABLE 17

| Uplink/Downlink Configuration of the SCell | Uplink/Downlink Configuration of the PCell | | | | | | |
|---|---|---|---|---|---|---|---|
| | 0 | 1 | 2 | 3 | 4 | 5 | 6 |
| 0 | 0 | 0 | 0 | 0 | 0 | 0 | 0 |
| 1 | 1 | 1 | 1 | 1 | 1 | 1 | 1 |
| 2 | 1 | 1 | 2 | 2 | 2 | 2 | 1 |
| 3 | 3 | 1 | 3 | 3 | 3 | 3 | 3 |
| 4 | 1 | 1 | 4 | 4 | 4 | 4 | 1 |
| 5 | 1 | 1 | 5 | 5 | 5 | 5 | 1 |
| 6 | 0 | 6 | 6 | 6 | 6 | 6 | 6 |

3. Under the Circumstance that Non-Cross-Carrier Scheduling is Employed and the UE is Half-Duplex.

For a Scheduled Cell, as an example 3-1, a PUSCH timing relationship according to which the largest number of uplink sub-frames could be schedule is selected as a PUSCH timing relationship of the Scheduled Cell in priority. Specific regulations are as follows.

If an Uplink/Downlink Configuration of a SCell is Uplink/Downlink Configuration 0, then a PUSCH timing relationship corresponding to the Uplink/Downlink Configuration 0 is selected as the PUSCH timing relationship of the SCell.

If the Uplink/Downlink Configuration of the SCell is Uplink/Downlink Configuration 6 and an Uplink/Downlink Configuration of a PCell is Uplink/Downlink Configuration 0, then a PUSCH timing relationship corresponding to the Uplink/Downlink Configuration 0 is selected as the PUSCH timing relationship of the SCell. If the Uplink/Downlink Configuration of the PCell is an Uplink/Downlink Configuration other than the Uplink/Downlink Configuration 0, i.e., any one of Uplink/Downlink Configurations 1, 2, 3, 4, 5 or 6, then a PUSCH timing relationship corresponding to the TDD Uplink/Downlink Configuration 6 is selected as the PUSCH timing relationship of the SCell.

If the Uplink/Downlink Configuration of the SCell is an Uplink/Downlink Configuration other than the Uplink/Downlink Configurations 0 and 6, i.e., any one of Uplink/Downlink Configurations 1, 2, 3, 4 or 5, then the PUSCH timing relationship is selected according to the following regulations:

a) based on the number and positions of the downlink frames which could be used by the SCell, a PUSCH timing relationship, according to which the largest number of uplink sub-frames of the SCell can be scheduled, corresponding to an Uplink/Downlink Configuration selected among the Uplink/Downlink Configurations 1, 2, 3, 4 or 5, is taken as a PUSCH timing relationship for scheduling; and b) if there are a variety of timing relationships meeting the condition a), which include the timing relationship of the SCell, then the PUSCH timing relationship of the SCell is selected in priority.

The TDD Uplink/Downlink Configurations corresponding to the selected PUSCH timing relationships obtained according to the above example 3-1 are shown in Table 17.

Selection Table 17 of the PUSCH timing relationship of the SCell in accordance with example 3-1 under half-duplex non-cross-carrier scheduling is shown below.

Figure 11:
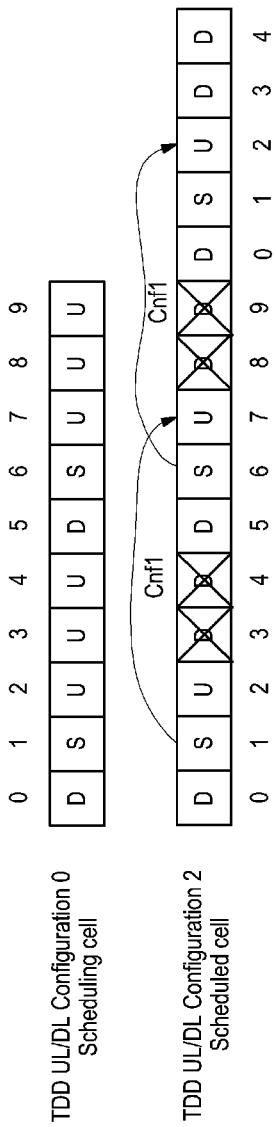
FIG. 11 is a schematic diagram illustrating that an Uplink/Downlink Configuration 2 schedules an Uplink/Downlink Configuration 2 through a PUSCH timing relationship of the Uplink/Downlink Configurations 1 under a circumstance in which a half-duplex Primary Cell (PCell) is Uplink/Downlink Configuration 0 according to an exemplary embodiment of the present invention.

For example, if a PCell is Uplink/Downlink Configuration 0, and a SCell is Uplink/Downlink Configuration 2, then two uplink sub-frames may be scheduled according to a PUSCH timing relationship corresponding to the Uplink/Downlink Configuration 1, while the number of the uplink sub-frames which could be scheduled according to any one of the PUSCH timing relationships corresponding to the Uplink/Downlink Configurations 2, 3, 4 and 5 are all zero, so that the PUSCH timing relationship corresponding to the Uplink/Downlink Configuration 1 is selected as the PUSCH timing relationship of the SCell, as shown in FIG. 11.

FIG. 11 is a schematic diagram illustrating that an Uplink/Downlink Configuration 2 schedules an Uplink/Downlink Configuration 2 through a PUSCH timing relationship of the Uplink/Downlink Configurations 1 under a circumstance in which a half-duplex Primary Cell (PCell) is Uplink/Downlink Configuration 0 according to an exemplary embodiment of the present invention.

In addition, as an example 3-2, a PUSCH timing relationship of a SCell may be selected in priority as the PUSCH timing relationship of the SCell. If the number of the uplink sub-frames which could be scheduled according to the PUSCH timing relationship of the SCell is zero, then a PUSCH timing relationship according to which the largest number of uplink sub-frames can be scheduled is selected from six PUSCH timing relationships defined in 3GPP Release 10 other than the timing relationship corresponding to the TDD Uplink/Downlink Configuration of this SCell, and is taken as the PUSCH timing relationship of the Scheduled Cell. Specific regulations are as follows.

If the Uplink/Downlink Configuration of the SCell is Uplink/Downlink Configuration 0 or Uplink/Downlink Configuration 6, then the PUSCH timing relationship corresponding to the Uplink/Downlink Configuration 0 or Uplink/Downlink Configuration 6 is directly used as the PUSCH timing relationship of the SCell.

If the Uplink/Downlink Configuration of the SCell is an Uplink/Downlink Configuration other than the Uplink/Downlink Configurations 0 and 6, i.e., any one of Uplink/Downlink Configurations 1, 2, 3, 4 or 5, then it is judged first whether the number of the uplink sub-frames which could be scheduled according to the PUSCH timing relationship corresponding to the Uplink/Downlink Configuration of the SCell is equal to zero. If it is judged that the number of the uplink sub-frames which could be scheduled according to the PUSCH timing relationship corresponding to the Uplink/Downlink Configuration of the SCell is not equal to zero, then the PUSCH timing relationship corresponding to the Uplink/Downlink Configuration of the SCell is selected as the PUSCH timing relationship of the Scheduled Cell. If it is judged that the number of the uplink sub-frames which could be scheduled according to the PUSCH timing relationship corresponding to the Uplink/Downlink Configuration of the SCell is equal to zero, then a PUSCH timing relationship, according to which the largest number of uplink sub-frames can be scheduled, corresponding to an Uplink/Downlink Configuration selected among the Uplink/Downlink Configurations 1, 2, 3, 4 or 5, is taken as the PUSCH timing relationship of the Scheduled Cell.

The TDD Uplink/Downlink Configurations corresponding to the selected PUSCH timing relationships obtained according to the above example 3-2 are shown in Table 18.

Selection Table 18 of the PUSCH timing relationship of the SCell in accordance with example 3-2 under half-duplex non-cross-carrier scheduling is shown below.

TABLE 18

| Uplink/Downlink Configuration of the SCell | Uplink/Downlink Configuration of the PCell | | | | | | |
|---|---|---|---|---|---|---|---|
| | 0 | 1 | 2 | 3 | 4 | 5 | 6 |
| 0 | 0 | 0 | 0 | 0 | 0 | 0 | 0 |
| 1 | 1 | 1 | 1 | 1 | 1 | 1 | 1 |
| 2 | 1 | 1 | 2 | 2 | 2 | 2 | 1 |
| 3 | 3 | 3 | 3 | 3 | 3 | 3 | 3 |
| 4 | 1 | 4 | 4 | 4 | 4 | 4 | 4 |
| 5 | 1 | 1 | 5 | 5 | 5 | 5 | 1 |
| 6 | 6 | 6 | 6 | 6 | 6 | 6 | 6 |

Figure 12:
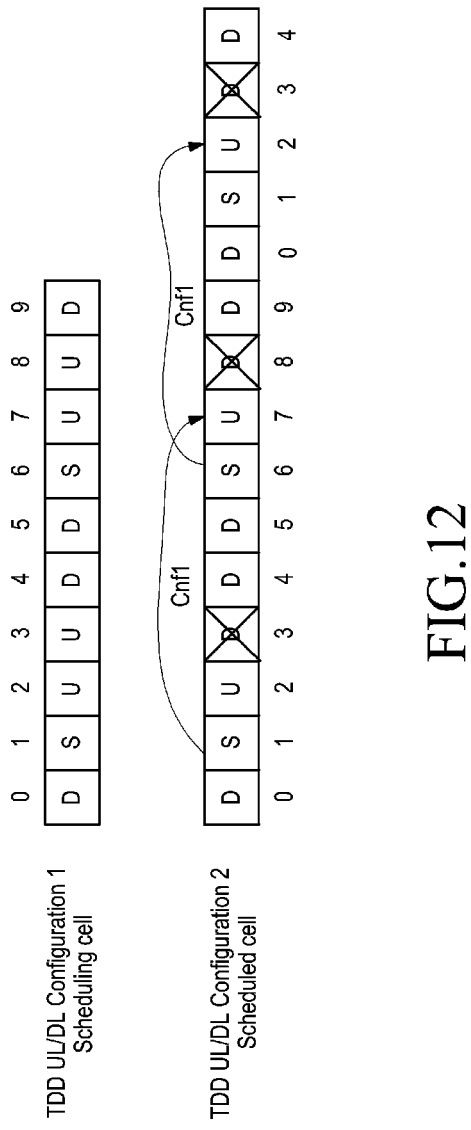
FIG. 12 is a schematic diagram illustrating that an Uplink/Downlink Configuration 2 schedules an Uplink/Downlink Configuration 2 through a PUSCH timing relationship of the Uplink/Downlink Configurations 1 under a circumstance that a half-duplex PCell is Uplink/Downlink Configuration 1 according to an exemplary embodiment of the present invention.

For example, if a PCell is Uplink/Downlink Configuration 1, and a SCell is Uplink/Downlink Configuration 2, then the number of the uplink sub-frames which could be scheduled according to the PUSCH timing relationship corresponding to the Uplink/Downlink Configuration 2 is zero, and two uplink sub-frames could be scheduled via the PUSCH timing relationship corresponding to the Uplink/Downlink Configuration 1, while the number of the uplink sub-frames which could be scheduled according to any one of the PUSCH timing relationships corresponding to the Uplink/Downlink Configurations 3, 4 and 5 are all zero, so that the PUSCH timing relationship corresponding to the Uplink/Downlink Configuration 1 is selected as the PUSCH timing relationship of the Scheduled Cell, as shown in FIG. 12.

FIG. 12 is a schematic diagram illustrating that an Uplink/Downlink Configuration 2 schedules an Uplink/Downlink Configuration 2 through a PUSCH timing relationship of the Uplink/Downlink Configurations 1 under a circumstance that a half-duplex PCell is Uplink/Downlink Configuration 1 according to an exemplary embodiment of the present invention.

For a Scheduled Cell, under the circumstance that non-cross-carrier scheduling is employed and the UE is half-duplex, when the Scheduled Cell is Uplink/Downlink Configuration 0 or Uplink/Downlink Configuration 6, if uplink frames of a PCell is fewer in number, then uplink frames which could be used for uplink transmission in the Scheduled Cell will be fewer in number also, at this time, if it is scheduled according to the PUSCH timing relationship corresponding to Uplink/Downlink Configuration 0 or Uplink/Downlink Configuration 6, then time delay of each HARQ process will be great. Therefore, when the Uplink/Downlink Configuration of the Scheduled Cell is Uplink/Downlink Configuration 0 or Uplink/Downlink Configuration 6, another example, namely example 3-3, is provided in which the PUSCH timing relationship is selected according to the following regulations.

If an Uplink/Downlink Configuration of a SCell is Uplink/Downlink Configuration 0 or Uplink/Downlink Configuration 6, and an Uplink/Downlink Configuration of a PCell makes the number of uplink sub-frames of the PCell in a radio frame less than a specific threshold N, then a PUSCH timing relationship, according to which the largest number of uplink sub-frames can be scheduled, corresponding to an Uplink/Downlink Configuration selected among the Uplink/Downlink Configurations 1, 2, 3, 4 or 5, is taken as the PUSCH timing relationship of the Scheduled Cell. If there are a variety of PUSCH timing relationships meeting the above condition, then a PUSCH timing relationship having a minimum HARQ processes is selected as the PUSCH timing relationship of the Scheduled Cell. If the number of the uplink sub-frames which could be scheduled according to any one of the PUSCH timing relationships corresponding to the Uplink/Downlink Configurations 1, 2, 3, 4 and 5 is zero, then the PUSCH timing relationship corresponding to the Uplink/Downlink Configuration of the SCell is used as the PUSCH timing relationship of the Scheduled Cell.

If the Uplink/Downlink Configuration of the SCell is Uplink/Downlink Configuration 0 or Uplink/Downlink Configuration 6 and the Uplink/Downlink Configuration of the PCell makes the number of uplink sub-frames of the PCell in a radio frame greater than or equal to the specific threshold N, then the PUSCH timing relationship of the Scheduled Cell may be selected through selection methods of the example 3-1 or example 3-2.

For example, when it is assumed that N=3, the Uplink/Downlink Configuration of a PCell is any one of Uplink/Downlink Configurations 2, 4 or 5, then a PUSCH timing relationship, according to which the largest number of uplink sub-frames can be scheduled, corresponding to an Uplink/Downlink Configuration selected among the Uplink/Downlink Configurations 1, 2, 3, 4 or 5, is taken as the PUSCH timing relationship of the Scheduled Cell. If there are a variety of PUSCH timing relationships meeting the above condition, then a PUSCH timing relationship having a minimum HARQ processes is selected as the PUSCH timing relationship of the Scheduled Cell. If the number of the uplink sub-frames which could be scheduled by the PUSCH timing relationships corresponding to the Uplink/Downlink Configurations 1, 2, 3, 4 and 5 is zero, then the PUSCH timing relationship corresponding to the Uplink/Downlink Configuration of this Cell is used as the PUSCH timing relationship of the Scheduled Cell. If the Uplink/Downlink Configuration of the PCell is any one of Uplink/Downlink Configurations 0, 1, 3 or 6 (the number of uplink sub-frames of these three kinds of Uplink/Downlink Configurations is greater than or equal to 3, a method that the Uplink/Downlink Configuration selected here is determined according to other thresholds of the number of uplink sub-frames is also within the scope of the present invention), then the PUSCH timing relationship of the Scheduled Cell may be selected through selection methods of the example 3-1 or example 3-2.

Using the method of example 3-3, when N=3, the TDD Uplink/Downlink Configurations corresponding to the PUSCH timing relationships of the SCells in Table 17 of the example 3-1 and Table 18 of the example 3-2 are respectively shown in Table 19 and Table 20.

Selection Table 19 (corresponding to a way using example 3-1) of the PUSCH timing relationship of the SCell in accordance with the example 3-3 under half-duplex non-cross-carrier scheduling is shown below.

TABLE 19

| Uplink/Downlink Configuration of the SCell | Uplink/Downlink Configuration of the PCell | | | | | | |
|---|---|---|---|---|---|---|---|
| | 0 | 1 | 2 | 3 | 4 | 5 | 6 |
| 0 | 0 | 0 | 1 | 0 | 1 | 1 | 0 |
| 1 | 1 | 1 | 1 | 1 | 1 | 1 | 1 |
| 2 | 1 | 1 | 2 | 2 | 2 | 2 | 1 |
| 3 | 3 | 1 | 3 | 3 | 3 | 3 | 3 |
| 4 | 1 | 1 | 4 | 4 | 4 | 4 | 1 |
| 5 | 1 | 1 | 5 | 5 | 5 | 5 | 1 |
| 6 | 0 | 6 | 1 | 6 | 1 | 1 | 6 |

Selection Table 20 (corresponding to a way using example 3-2) of the PUSCH timing relationship of the SCell in accordance with the example 3-3 under half-duplex non-cross-carrier scheduling is shown below.

TABLE 20

| Uplink/Downlink Configuration of the SCell | Uplink/Downlink Configuration of the PCell | | | | | | |
|---|---|---|---|---|---|---|---|
| | 0 | 1 | 2 | 3 | 4 | 5 | 6 |
| 0 | 0 | 0 | 1 | 0 | 1 | 1 | 0 |
| 1 | 1 | 1 | 1 | 1 | 1 | 1 | 1 |
| 2 | 1 | 1 | 2 | 2 | 2 | 2 | 1 |
| 3 | 3 | 3 | 3 | 3 | 3 | 3 | 3 |
| 4 | 1 | 4 | 4 | 4 | 4 | 4 | 4 |
| 5 | 1 | 1 | 5 | 5 | 5 | 5 | 1 |
| 6 | 6 | 6 | 1 | 6 | 1 | 1 | 6 |

In addition, as TDD Uplink/Downlink Configuration 0 and TDD Uplink/Downlink Configuration 6 are special TDD Uplink/Downlink Configurations in that their HARQ Round Trip Time (HARQ RTT) Cycles are not 10 ms, and corresponding relationships between each HARQ process and the uplink sub-frames will be changed with the change of system frames, therefore, when the PCell is TDD Uplink/Downlink Configuration 0 or TDD Uplink/Downlink Configuration 6, if the TDD Uplink/Downlink Configuration of the Scheduled Cell (which includes SCells in non-cross-carrier scheduling, and the same hereinafter) is any one of Uplink/Downlink Configurations 1, 2, 3, 4 or 5, at this time, if the PUSCH of the Scheduled Cell is scheduled according to the PUSCH timing relationship of the PCell, then there will exist one or more problems.

For a special circumstance that the PCell is TDD Uplink/Downlink Configuration 0 or TDD Uplink/Downlink Configuration 6, as an example 4, a solution is as follows.

Firstly, if a Scheduled Cell is any one of TDD Uplink/Downlink Configurations 1, 2, 3, 4 or 5, as an example 4-1, a PUSCH timing relationship of the Scheduled Cell may be determined through the following two ways.

Way 1: a PUSCH timing relationship, according to which the largest number of uplink sub-frames can be scheduled, corresponding to an Uplink/Downlink Configuration selected among the Uplink/Downlink Configurations 1, 2, 3, 4 or 5, is taken as the PUSCH timing relationship of the Scheduled Cell. If there are a variety of PUSCH timing relationships meeting the condition, then a PUSCH timing relationship corresponding to the TDD Uplink/Downlink Configuration of the Scheduled Cell is selected in priority.

Way 2: the PUSCH timing relationship corresponding to the TDD Uplink/Downlink Configuration of the Scheduled Cell is selected in priority. If the number of uplink frames which could be scheduled according to the PUSCH timing relationship corresponding to the TDD Uplink/Downlink Configuration of the Scheduled Cell is zero, then a PUSCH timing relationship, according to which the largest number of uplink sub-frames can be scheduled, corresponding to an Uplink/Downlink Configuration selected among the Uplink/Downlink Configurations 1, 2, 3, 4 or 5, is taken as the PUSCH timing relationship of the Scheduled Cell.

The TDD Uplink/Downlink Configurations corresponding to the selected PUSCH timing relationships obtained according to the above example 4-1 are shown in Table 21 and Table 22. The selected PUSCH timing relationships indicated by these two tables applies to three circumstances including full-duplex cross-carrier scheduling, half-duplex cross-carrier scheduling and half-duplex non-cross-carrier scheduling.

Selection Table 21 of the PUSCH timing relationship of the Scheduled Cell under a circumstance that the PCell is one of TDD Uplink/Downlink Configurations 0 or 6 and the Scheduled Cell is any one of TDD Uplink/Downlink Configurations 1-5 (corresponding to the way 1) is shown below.

TABLE 21

| Uplink/Downlink Configuration of the Scheduled Cell | Uplink/Downlink Configuration of the Scheduling Cell | |
|---|---|---|
| | 0 | 6 |
| 1 | 1 | 1 |
| 2 | 1 | 1 |
| 3 | 3 | 3 |
| 4 | 1 | 1 |
| 5 | 1 | 1 |

Selection Table 22 of the PUSCH timing relationship of the Scheduled Cell under a circumstance that the PCell is one of TDD Uplink/Downlink Configurations 0 or 6 and the Scheduled Cell is any one of TDD Uplink/Downlink Configurations 1-5 (corresponding to the way 2) is shown below.

TABLE 22

| Uplink/Downlink Configuration of the Scheduled Cell | Uplink/Downlink Configuration of the Scheduling Cell | |
|---|---|---|
| | 0 | 6 |
| 1 | 1 | 1 |
| 2 | 1 | 1 |
| 3 | 3 | 3 |
| 4 | 1 | 4 |
| 5 | 1 | 1 |

Secondly, if a Scheduled Cell is TDD Uplink/Downlink Configuration 0 or TDD Uplink/Downlink Configuration 6, as an example 4-2, for different circumstances such as full-duplex cross-carrier scheduling, half-duplex cross-carrier scheduling and half-duplex non-cross-carrier scheduling, a method for selecting the PUSCH timing relationship is shown as follows.

A. In Full-Duplex Cross-Carrier Scheduling:

If a Scheduling Cell is Uplink/Downlink Configuration 6 and a Scheduled Cell is Uplink/Downlink Configuration 0, then the PUSCH timing relationship corresponding to Uplink/Downlink Configuration 0 or Uplink/Downlink Configuration 6 may be selected as the PUSCH timing relationship of the Scheduled Cell.

Wherein, when the PUSCH timing relationship corresponding to Uplink/Downlink Configuration 0 is selected, the scheduled uplink sub-frames may be maximized, but a PHICH timing relationship of the Scheduled Cell is not consistent with the timing relationship of the Scheduling Cell. However, when the PUSCH timing relationship corresponding to Uplink/Downlink Configuration 6 is selected, the scheduled uplink sub-frames may be maximized under the circumstance of mitigating the above problem.

If a Scheduling Cell is Uplink/Downlink Configuration 0 and a Scheduled Cell is Uplink/Downlink Configuration 6, then the PUSCH timing relationship corresponding to Uplink/Downlink Configuration 0 or Uplink/Downlink Configuration 6 or Uplink/Downlink Configuration 1 may be selected as the PUSCH timing relationship of the Scheduled Cell.

Wherein, if the PUSCH timing relationship corresponding to Uplink/Downlink Configuration 0 is selected, then the largest number of uplink sub-frames may be scheduled, and a PHICH timing of the Scheduled Cell may be ensured to be consistent with that of the Scheduling Cell. If the PUSCH timing relationship corresponding to Uplink/Downlink Configuration 6 is selected, all PHICH timing relationships according to which the UE is scheduled within the Scheduled Cell may be ensured to be the same, which is conducive to simplify a scheduler algorithm, but these two selections may introduce additional time delay to each HARQ process. However, if the PUSCH timing relationship corresponding to Uplink/Downlink Configuration 1 is selected, the scheduled uplink sub-frames may be maximized under the circumstance of mitigating the above problem.

The TDD Uplink/Downlink Configurations, which are obtained according to the above regulations, corresponding to the PUSCH timing relationships selected under the circumstance of full-duplex cross-carrier scheduling are shown in Table 23.

Selection Table 23 of the PUSCH timing relationship of the Scheduled Cell under the circumstance that the Scheduling Cell is one of TDD Uplink/Downlink Configurations 0 or 6 and the Scheduled Cell is one of TDD Uplink/Downlink Configuration 0 or 6 (full-duplex cross-carrier scheduling) is shown below.

TABLE 23

| Uplink/Downlink Configuration of the Scheduled Cell | Uplink/Downlink Configuration of the Scheduling Cell | |
|---|---|---|
| | 0 | 6 |
| 0 | 0 | 0 or 6 |
| 6 | 0, 6 or 1 | 6 |

B. In Half-Duplex Cross-Carrier Scheduling:

If a Scheduling Cell is Uplink/Downlink Configuration 6 and a Scheduled Cell is Uplink/Downlink Configuration 0, then the PUSCH timing relationship corresponding to Uplink/Downlink Configuration 6 may be selected as the PUSCH timing relationship of the Scheduled Cell.

If a Scheduling Cell is Uplink/Downlink Configuration 0 and a Scheduled Cell is Uplink/Downlink Configuration 6, then the PUSCH timing relationship corresponding to Uplink/Downlink Configuration 0 or Uplink/Downlink Configuration 6 or Uplink/Downlink Configuration 1 may be selected as the PUSCH timing relationship of the Scheduled Cell.

Wherein, if the PUSCH timing relationship corresponding to Uplink/Downlink Configuration 0 is selected, then the largest number of uplink sub-frames may be scheduled, and a PHICH timing of the Scheduled Cell may be ensured to be consistent with that of the Scheduling Cell. If the PUSCH timing relationship corresponding to Uplink/Downlink Configuration 6 is selected, all PHICH timing relationships according to which the UE is scheduled within the Scheduled Cell may be ensured to be the same, which is conducive to simplify a scheduler algorithm, but these two selections may result in a situation that the PUSCH is scheduled to a closed downlink sub-frame. However, if the PUSCH timing relationship corresponding to Uplink/Downlink Configuration 1 is selected, scheduled uplink sub-frames may be maximized under the circumstance of mitigating the above problem.

The TDD Uplink/Downlink Configurations, which are obtained According to the above regulations, corresponding to the PUSCH timing relationships selected under the circumstance of half-duplex cross-carrier scheduling are shown in Table 24.

Selection Table 24 of the PUSCH timing relationship of the Scheduled Cell under the circumstance that the Scheduling Cell is one of TDD Uplink/Downlink Configurations 0 or 6 and the Scheduled Cell is one of TDD Uplink/Downlink Configurations 0 or 6 (half-duplex cross-carrier scheduling) is shown below.

TABLE 24

| Uplink/Downlink Configuration of the Scheduled Cell | Uplink/Downlink Configuration of the Scheduling Cell | |
|---|---|---|
| | 0 | 6 |
| 0 | 0 | 6 |
| 6 | 0, 6 or 1 | 6 |

C. In Half-Duplex Non-Cross-Carrier Scheduling:

If a PCell is Uplink/Downlink Configuration 6 and a non-cross-carrier scheduled SCell is Uplink/Downlink Configuration 0, then the PUSCH timing relationship corresponding to Uplink/Downlink Configuration 0 or Uplink/Downlink Configuration 1 may be selected as the PUSCH timing relationship of the SCell.

Wherein, if the PUSCH timing relationship corresponding to Uplink/Downlink Configuration 0 is selected, the scheduled uplink sub-frames may be maximized, and a PHICH timing relationship is consistent with the timing relationship of the SCell, but a situation may result in that the PUSCH is scheduled to a closed uplink sub-frame. However, if the PUSCH timing relationship corresponding to Uplink/Downlink Configuration 1 is selected, the scheduled uplink sub-frames may be maximized under the circumstance of mitigating the above problem.

If a PCell is Uplink/Downlink Configuration 0 and a non-cross-carrier scheduled SCell is Uplink/Downlink Configuration 6, then the PUSCH timing relationship corresponding to Uplink/Downlink Configuration 0 or Uplink/Downlink Configuration 6 or Uplink/Downlink Configuration 1 may be selected as the PUSCH timing relationship of the SCell.

Wherein, if the PUSCH timing relationship corresponding to Uplink/Downlink Configuration 0 is selected, then the largest number of uplink sub-frames may be scheduled. If the PUSCH timing relationship corresponding to Uplink/Downlink Configuration 6 is selected, all PHICH timing relationships according to which the UE is scheduled within the SCell may be ensured to be the same, which is conducive to simplify a scheduler algorithm, and a PHICH timing is consistent with that of the SCell, but these two selections may result in a situation that the PUSCH is scheduled to a closed downlink sub-frame. If the PUSCH timing relationship corresponding to Uplink/Downlink Configuration 1 is selected, the scheduled uplink sub-frames may be maximized under the circumstance of mitigating the above problem.

The TDD Uplink/Downlink Configurations, which are obtained according to the above regulations, corresponding to the PUSCH timing relationships selected under the circumstance of half-duplex non-cross-carrier scheduling are shown in Table 25.

Selection Table 25 of the PUSCH timing relationship of the SCell under the circumstance that the PCell is one of TDD Uplink/Downlink Configurations 0 or 6 and the SCell is one of TDD Uplink/Downlink Configurations 0 or 6 (half-duplex non-cross-carrier scheduling) is shown below.

TABLE 25

| Uplink/Downlink Configuration of the SCell | Uplink/Downlink Configuration of the PCell | |
|---|---|---|
| | 0 | 6 |
| 0 | 0 | 0 or 1 |
| 6 | 0, 6 or 1 | 6 |

The example 4 introduces methods of selecting a PUSCH timing relationship for a SCell or a Scheduled Cell under the circumstance that a TDD Uplink/Downlink Configuration of a Scheduling Cell is 0 or 6. Wherein, for two cases that the TDD Uplink/Downlink Configuration of the SCell or the Scheduled Cell is TDD Uplink/Downlink Configuration 0 or TDD Uplink/Downlink Configuration 6 as well as any one of TDD Uplink/Downlink Configurations 1-5, and three circumstances including full-duplex cross-carrier scheduling, half-duplex cross-carrier scheduling and half-duplex non-cross-carrier scheduling, specific selection methods and selection results of the PUSCH timing relationship are respectively given. These tables respectively represent an implementation under a single circumstance and case, these selection results may be combined with the selection results of the PUSCH timing relationship corresponding to the same circumstances (referring to the full-duplex cross-carrier scheduling, the half-duplex cross-carrier scheduling or the half-duplex non-cross-carrier scheduling) in example 1, 2 and 3 as well as the PCell is any one of Uplink/Downlink Configurations 1, 2, 3, 4 or 5, so that a complete solution of this circumstance is constituted.

For example, for a circumstance that a UE is full-duplex and it is the cross-carrier scheduling, the selection results of the PUSCH timing relationship in Table 5 when the Scheduling Cell is any one of TDD Uplink/Downlink Configurations 1, 2, 3, 4 and 5 may be combined with Table 21 and Table 23. Therefore a PUSCH timing relationship table selected according to a principle of maximizing the scheduled uplink sub-frames, under the circumstance that the UE is full-duplex and cross-carrier scheduling is employed, is consisted, as shown in Table 26. The selection results of the PUSCH timing relationship in Table 7 when the Scheduling Cell is any one of TDD Uplink/Downlink Configurations 1, 2, 3, 4 and 5 may be combined with Table 22 and Table 23. Therefore a PUSCH timing relationship table selected according to a principle of selecting the PUSCH timing relationships of the Scheduling Cell and the Scheduled Cell in priority, under a circumstance that the UE is full-duplex and it is the cross-carrier scheduling, is consisted, as shown in Table 27. There are a variety of other combinations, which are not repeated here.

Selection Table 26 of the PUSCH timing relationship of the Scheduled Cell under the circumstance of full-duplex cross-carrier scheduling (according to the principle of maximizing the scheduled uplink sub-frames) is shown below.

TABLE 26

| Uplink/Downlink Configuration of the Scheduled Cell | Uplink/Downlink Configuration of the Scheduling Cell | | | | | |
|---|---|---|---|---|---|---|
| | 0 | 1 | 2 | 3 | 4 | 5 | 6 |
| 0 | 0 | 0 | 0 | 0 | 0 | 0 | 0 or 6 |
| 1 | 1 | 1 | 1 | 1 | 1 | 1 | 1 |
| 2 | 1 | 1 | 2 | 1 | 1 | 2 | 1 |
| 3 | 3 | 1 | 3 | 3 | 3 | 3 | 3 |
| 4 | 1 | 1 | 4 | 3 | 4 | 4 | 1 |
| 5 | 1 | 1 | 2 | 3 | 4 | 5 | 1 |
| 6 | 0, 6 or 1 | 6 | 6 | 6 | 6 | 6 | 6 |

Selection Table 27 of the PUSCH timing relationship of the Scheduled Cell under the circumstance of full-duplex cross-carrier scheduling (according to the principle of selecting the PUSCH timing relationships of the Scheduling Cell and the Scheduled Cell in priority) is shown below.

TABLE 27

| Uplink/Downlink Configuration of the Scheduled Cell | Uplink/Downlink Configuration of the Scheduling Cell | | | | | |
|---|---|---|---|---|---|---|
| | 0 | 1 | 2 | 3 | 4 | 5 | 6 |
| 0 | 0 | 0 | 0 | 0 | 0 | 0 | 0 or 6 |
| 1 | 1 | 1 | 1 | 1 | 1 | 1 | 1 |
| 2 | 1 | 1 | 2 | 3 | 4 | 2 | 1 |
| 3 | 3 | 1 | 3 | 3 | 3 | 3 | 3 |
| 4 | 1 | 1 | 4 | 3 | 4 | 4 | 4 |
| 5 | 1 | 1 | 2 | 3 | 4 | 5 | 1 |
| 6 | 0, 6 or 1 | 6 | 6 | 6 | 6 | 6 | 6 |

Figure 13:
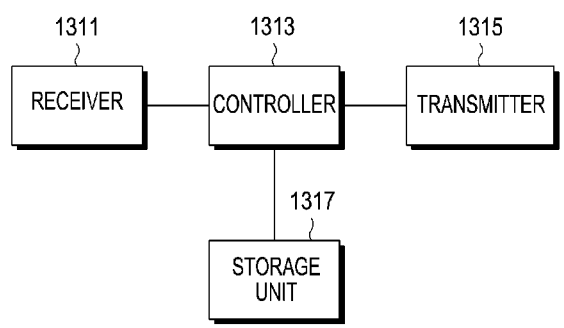
FIG. 13 schematically illustrates an internal structure of a User Equipment (UE) in a cellular radio communication system supporting a Carrier Aggregation (CA) scheme according to an exemplary embodiment of the present invention.

FIG. 13 schematically illustrates an internal structure of a UE in a cellular radio communication system supporting a CA scheme according to an exemplary embodiment of the present invention.

Referring to FIG. 13, a UE includes a receiver 1311, a controller 1313, a transmitter 1315, and a storage unit 1317.

The controller 1313 controls the overall operation of the UE. In particular, the controller 1313 controls the UE to perform an operation of transmitting a PUSCH signal according to an exemplary embodiment of the present invention. The operation of transmitting the PUSCH signal is performed in the manner described before with reference to FIGS. 3 to 12, so a detailed description will be omitted here.

The receiver 1311 receives signals from a BS, etc. under the control of the controller 1313. The signals received in the receiver 1311 are described before with reference to FIGS. 3 to 12, so a detailed description will be omitted here.

The transmitter 1315 transmits signals to the BS, etc. under a control of the controller 1313. The signals transmitted in the transmitter 1315 are described before with reference to FIGS. 3 to 12, so a detailed description will be omitted here.

The storage unit 1317 stores the signals received by the receiver 1311 and data for an operation of the UE, e.g., information related to the operation of transmitting the PUSCH signal.

While the receiver 1311, the controller 1313, the transmitter 1315, and the storage unit 1317 are shown in FIG. 13 as separate units, it is to be understood that this is for merely convenience of description. In other words, two or more of the receiver 1311, the controller 1313, the transmitter 1315, and the storage unit 1317 may be incorporated into a single unit.

Figure 14:
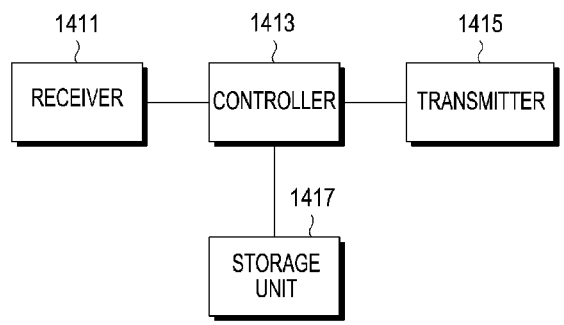
FIG. 14 schematically illustrates an internal structure of a Base Station (BS) in a cellular radio communication system supporting a CA scheme according to an exemplary embodiment of the present invention.

FIG. 14 schematically illustrates an internal structure of a BS in a cellular radio communication system supporting a CA scheme according to an exemplary embodiment of the present invention.

Referring to FIG. 14, a BS includes a receiver 1411, a controller 1413, a transmitter 1415, and a storage unit 1417.

The controller 1413 controls the overall operation of the BS. In particular, the controller 1413 controls the BS to perform an operation related to a PUSCH signal transmission operation in a UE and an operation related to a PUSCH signal reception operation according to an exemplary embodiment of the present invention. The operation related to the PUSCH signal transmission operation in the UE and the operation related to the PUSCH signal reception operation are performed in the manner described before with reference to FIGS. 3 to 12, so a detailed description will be omitted here.

The receiver 1411 receives signals from the UE, etc. under a control of the controller 1413. The signals received in the receiver 1411 are described before with reference to FIGS. 3 to 12, so a detailed description will be omitted here.

The transmitter 1415 transmits signals to the UE, etc. under a control of the controller 1413. The signals transmitted in the transmitter 1415 are described before with reference to FIGS. 3 to 12, so a detailed description will be omitted here.

The storage unit 1417 stores the signals received by the receiver 1411 and data for an operation of the BS, e.g., information related to the PUSCH signal transmission operation in the UE and the operation related to the PUSCH signal reception operation.

While the receiver 1411, the controller 1413, the transmitter 1415, and the storage unit 1417 are shown in FIG. 14 as separate units, it is to be understood that this is for merely convenience of description. In other words, two or more of the receiver 1411, the controller 1413, the transmitter 1415, and the storage unit 1417 may be incorporated into a single unit.

As can be seen from the above techniques, the method for transmitting the PUSCH of exemplary embodiments of the present invention, when TDD Uplink/Downlink Configurations of Carrier Aggregated Cells are not the same in the TDD system using CA, may determine the available PUSCH timing relationship according to the TDD Uplink/Downlink Configuration used by a specific Cell under different scenarios, thereby the PUSCH transmission is implemented. At the same time, definitions of PUSCH timing relationships under different TDD Uplink/Downlink Configurations does not need to be modified in protocols of the related art, and the largest number of uplink sub-frames with PUSCH may be ensured to be scheduled, so that an uplink peak throughput of the UE is improved.

As is apparent from the foregoing description, exemplary embodiments of the present invention enable a PUSCH signal transmission/reception in a cellular radio communication system supporting a CA scheme.

Exemplary embodiments of the present invention enable a PUSCH signal transmission/reception based on an UL/DL Configuration in cellular radio communication system supporting a CA scheme.

Exemplary embodiments of the present invention enable a PUSCH signal transmission/reception by considering a TDD scheme in cellular radio communication system supporting a CA scheme.

Exemplary embodiments of the present invention enable a PUSCH signal transmission/reception by considering a primary cell or a secondary cell in cellular radio communication system supporting a CA scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting a physical uplink shared channel (PUSCH) signal by a user equipment (UE) in a communication system supporting a carrier aggregation (CA) scheme, the method comprising:

transmitting, to a base station (BS), a PUSCH signal for a specific cell based on a PUSCH timing relationship for the specific cell, wherein the UE is configured with at least two cells including the specific cell, and uplink (UL)/downlink (DL) configurations for the at least two cells are different, wherein the PUSCH timing relationship for the specific cell is determined according to at least a transmission mode of the UE, a scheduling policy of the UE, and a PUSCH timing relationship corresponding to a first UL/DL configuration among UL/DL configurations supported in the communication system, and wherein the transmission mode of the UE is one of a full-duplex transmission mode and a half-duplex transmission mode, and the scheduling policy of the UE is one of a cross-carrier scheduling, a non-cross-carrier scheduling, a full-duplex cross-carrier scheduling, and a half-duplex cross-carrier scheduling.

2. The method of claim 1, wherein the PUSCH timing relationship for the specific cell includes at least one of a timing relationship from a UL grant to a PUSCH, a timing relationship from a physical hybrid automatic repeat request (HARQ) indicator channel (PHICH) to a PUSCH, and a timing relationship from a PUSCH to a PHICH.

3. The method of claim 2, wherein, if the scheduling policy of the UE is the cross-carrier scheduling, the transmission mode of the UE is the full-duplex transmission mode, and the specific cell is a scheduling cell, the first UL/DL configuration is a UL/DL configuration for the scheduling cell, wherein, if the scheduling policy of the UE is the cross-carrier scheduling, the transmission mode of the UE is the full-duplex transmission mode, and the specific cell is a scheduled cell, the first UL/DL configuration is a specific UL/DL configuration among the UL/DL configurations supported in the communication system, and wherein the scheduling cell is a cell that receives a UL grant or HARQ-acknowledgement (ACK), and the scheduled cell is a cell that transmits the PUSCH signal.

4. The method of claim 3, wherein the specific UL/DL configuration is a UL/DL configuration that satisfies one of a first condition and a second condition, wherein the first condition is a condition in which serial numbers of sub-frames where a PUSCH signal transmission is located are the same if the UL/DL configuration for the scheduled cell is one of UL/DL configurations 1, 2, 3, 4, and 5, for cross-carrier scheduled PUSCHs which have a same HARQ identifier (ID), and wherein the second condition is a condition in which serial numbers of sub-frames where a PUSCH signal transmission is located are different if the UL/DL configuration for the scheduled cell is one of UL/DL configurations 0 and 6, for cross-carrier scheduled PUSCHs which have a same HARQ ID.

5. The method of claim 4, wherein, if there are a plurality of UL/DL configurations that satisfy the first condition or the second condition, the specific UL/DL configuration is a UL/DL configuration that is determined based on a priority among the plurality of UL/DL configurations.

6. The method of claim 5, wherein the priority is determined based on priorities for UL/DL configurations for the scheduling cell and priorities for UL/DL configurations for the scheduled cell.

7. The method of claim 3, wherein the specific UL/DL configuration satisfies a condition in which a maximum number of UL sub-frames will be scheduled based on the PUSCH timing relationship.

8. The method of claim 7, wherein, if there are a plurality of UL/DL configurations that satisfy the condition, the specific UL/DL configuration is a UL/DL configuration that is determined based on a priority among the plurality of UL/DL configurations.

9. The method of claim 8, wherein the priority is determined based on priorities for UL/DL configurations for the scheduling cell and priorities for UL/DL configurations for the scheduled cell.

10. The method of claim 8, wherein, if the scheduling policy of the UE is the non-cross-carrier scheduling, the transmission mode of the UE is the half-duplex transmission mode, and the specific cell is a secondary cell (SCell):
the first UL/DL configuration is a UL/DL configuration 0 if a UL/DL configuration for the SCell is the UL/DL configuration 0,
the first UL/DL configuration is a UL/DL configuration 0 if a UL/DL configuration for the SCell is a UL/DL configuration 6 and a UL/DL configuration for a primary cell (PCell) is the UL/DL configuration 0,
the first UL/DL configuration is a UL/DL configuration 6 if a UL/DL configuration for a PCell is different from a UL/DL configuration 0, and
the first UL/DL configuration is determined based on a number and positions of DL frames that the SCell may use if a UL/DL configuration for the SCell is different from UL/DL configurations 0 and 6.

11. The method of claim 2, wherein, if the scheduling policy of the UE is the non-cross-carrier scheduling, the transmission mode of the UE is the half-duplex transmission mode, and the specific cell is a secondary cell (SCell):
the first UL/DL configuration is a UL/DL configuration 0 or 6 if a UL/DL configuration for the SCell is the UL/DL configuration 0 or 6, and
the first UL/DL configuration is determined based on a number of UL frames that may be scheduled based on the PUSCH timing relationship if a UL/DL configuration for the SCell is different from UL/DL configurations 0 and 6.

12. The method of claim 2, wherein, if the scheduling policy of the UE is the full-duplex cross-carrier scheduling, the specific cell is a scheduled cell, a UL/DL configuration for a primary cell (PCell) is a UL/DL configuration 0 or 6, and a UL/DL configuration for the scheduled cell is the UL/DL configuration 0 or 6:
the first UL/DL configuration is the UL/DL configuration 0 or 6 if a UL/DL configuration for the scheduling cell is the UL/DL configuration 6 and the UL/DL configuration for the scheduled cell is the UL/DL configuration 0, and
the first UL/DL configuration is the UL/DL configuration 0 or 6 if a UL/DL configuration for the scheduling cell is the UL/DL configuration 0 and the UL/DL configuration for the scheduled cell is the UL/DL configuration 6.

13. The method of claim 2, wherein, if the scheduling policy of the UE is the half-duplex cross-carrier scheduling, the specific cell is a scheduled cell, a UL/DL configuration for a primary cell (PCell) is a UL/DL configuration 0 or 6, and a UL/DL configuration for the scheduled cell is the UL/DL configuration 0 or 6:
the first UL/DL configuration is the UL/DL configuration 6 if a UL/DL configuration for the scheduling cell is the UL/DL configuration 6 and the UL/DL configuration for the scheduled cell is the UL/DL configuration 0, and
the first UL/DL configuration is the UL/DL configuration 0, the UL/DL configuration 6, or a UL/DL configuration 1 if a UL/DL configuration for the scheduling cell is the UL/DL configuration 0 and the UL/DL configuration for the scheduled cell is the UL/DL configuration 6.

14. The method of claim 2, wherein, if the scheduling policy of the UE is the half-duplex non-cross-carrier scheduling, the specific cell is a non-cross-carrier scheduled cell, a UL/DL configuration for a primary cell (PCell) is a UL/DL configuration 0 or 6, and a UL/DL configuration for the non-cross-carrier scheduled cell is the UL/DL configuration 0 or 6:
the first UL/DL configuration is the UL/DL configuration 0 or a UL/DL configuration 1 if a UL/DL configuration for the PCell is the UL/DL configuration 6 and the UL/DL configuration for the non-cross-carrier scheduled cell is the UL/DL configuration 0, and
the first UL/DL configuration is the UL/DL configuration 0 or 6 if a UL/DL configuration for the PCell is the UL/DL configuration 0 and the UL/DL configuration for the non-cross-carrier scheduled cell is the UL/DL configuration 6.

15. A user equipment (UE) in a communication system supporting a carrier aggregation (CA) scheme, the UE comprising:
a transmitter configured to transmit, to a base station (BS), a physical uplink shared channel (PUSCH) signal for a specific cell based on a PUSCH timing relationship for the specific cell,
wherein the UE is configured with at least two cells including the specific cell, and uplink (UL)/downlink (DL) configurations for the at least two cells are different,
wherein the PUSCH timing relationship for the specific cell is determined according to at least a transmission mode of the UE, a scheduling policy of the UE, and a PUSCH timing relationship corresponding to a first UL/DL configuration among UL/DL configurations supported in the communication system, and
wherein the transmission mode of the UE is one of a full-duplex transmission mode and a half-duplex transmission mode, and the scheduling policy of the UE is one of a cross-carrier scheduling, a non-cross-carrier scheduling, a full-duplex cross-carrier scheduling, and a half-duplex cross-carrier scheduling.

16. The UE of claim 15, wherein the PUSCH timing relationship for the specific cell includes at least one of a timing relationship from a UL grant to a PUSCH, a timing relationship from a physical hybrid automatic repeat request (HARQ) indicator channel (PHICH) to a PUSCH, and a timing relationship from a PUSCH to a PHICH.

17. The UE of claim 16, wherein, if the scheduling policy of the UE is the cross-carrier scheduling, the transmission mode of the UE is the full-duplex transmission mode, and the specific cell is a scheduling cell, the first UL/DL configuration is a UL/DL configuration for the scheduling cell,
wherein, if the scheduling policy of the UE is the cross-carrier scheduling, the transmission mode of the UE is the full-duplex transmission mode, and the specific cell is a scheduled cell, the first UL/DL configuration is a specific UL/DL configuration among the UL/DL configurations supported in the communication system, and
wherein the scheduling cell is a cell that receives a UL grant or HARQ-acknowledgement (ACK), and the scheduled cell is a cell that transmits the PUSCH signal.

18. The UE of claim 17, wherein the specific UL/DL configuration is a UL/DL configuration that satisfies one of a first condition and a second condition,
wherein the first condition is a condition in which serial numbers of sub-frames where a PUSCH signal transmission is located are the same if the UL/DL configuration for the scheduled cell is one of UL/DL configurations 1, 2, 3, 4, and 5, for cross-carrier scheduled PUSCHs which have a same HARQ identifier (ID), and
wherein the second condition is a condition in which serial numbers of sub-frames where a PUSCH signal transmission is located are different if the UL/DL configuration for the scheduled cell is one of UL/DL configurations 0 and 6, for cross-carrier scheduled PUSCHs which have a same HARQ ID.

19. The UE of claim 18, wherein, if there are a plurality of UL/DL configurations that satisfy the first condition or the second condition, the specific UL/DL configuration is a UL/DL configuration that is determined based on a priority among the plurality of UL/DL configurations.

20. The UE of claim 19, wherein the priority is determined based on priorities for UL/DL configurations for the scheduling cell and priorities for UL/DL configurations for the scheduled cell.

21. The UE of claim 17, wherein the specific UL/DL configuration satisfies a condition in which a maximum number of UL sub-frames will be scheduled based on the PUSCH timing relationship.

22. The UE of claim 21, wherein, if there are a plurality of UL/DL configurations that satisfy the condition, the specific UL/DL configuration is a UL/DL configuration that is determined based on a priority among the plurality of UL/DL configurations.

23. The UE of claim 22, wherein the priority is determined based on priorities for UL/DL configurations for the scheduling cell and priorities for UL/DL configurations for the scheduled cell.

24. The UE of claim 16, wherein, if the scheduling policy of the UE is the non-cross-carrier scheduling, the transmission mode of the UE is the half-duplex transmission mode, and the specific cell is a secondary cell (SCell):
the first UL/DL configuration is a UL/DL configuration 0 if a UL/DL configuration for the SCell is the UL/DL configuration 0,
the first UL/DL configuration is a UL/DL configuration 0 if a UL/DL configuration for the SCell is a UL/DL configuration 6 and a UL/DL configuration for a primary cell (PCell) is the UL/DL configuration 0,
the first UL/DL configuration is a UL/DL configuration 6 if a UL/DL configuration for a PCell is different from a UL/DL configuration 0, and
the first UL/DL configuration is determined based on a number and positions of DL frames that the SCell may use if a UL/DL configuration for the SCell is different from UL/DL configurations 0 and 6.

25. The UE of claim 16, wherein, if the scheduling policy of the UE is the non-cross-carrier scheduling, the transmission mode of the UE is the half-duplex transmission mode, and the specific cell is a secondary cell (SCell):
the first UL/DL configuration is a UL/DL configuration 0 or 6 if a UL/DL configuration for the SCell is the UL/DL configuration 0 or 6, and
the first UL/DL configuration is determined based on a number of UL frames that may be scheduled based on the PUSCH timing relationship if a UL/DL configuration for the SCell is different from UL/DL configurations 0 and 6.

26. The UE of claim 16, wherein, if the scheduling policy of the UE is the full-duplex cross-carrier scheduling, the specific cell is a scheduled cell, a UL/DL configuration for a primary cell (PCell) is a UL/DL configuration 0 or 6, and a UL/DL configuration for the scheduled cell is the UL/DL configuration 0 or 6:
the first UL/DL configuration is the UL/DL configuration 0 or 6 if a UL/DL configuration for the scheduling cell is the UL/DL configuration 6 and the UL/DL configuration for the scheduled cell is the UL/DL configuration 0, and
the first UL/DL configuration is the UL/DL configuration 0 or 6 if a UL/DL configuration for the scheduling cell is the UL/DL configuration 0 and the UL/DL configuration for the scheduled cell is the UL/DL configuration 6.

27. The UE of claim 16, wherein, if the scheduling policy of the UE is the half-duplex cross-carrier scheduling, the specific cell is a scheduled cell, a UL/DL configuration for a primary cell (PCell) is a UL/DL configuration 0 or 6, and a UL/DL configuration for the scheduled cell is the UL/DL configuration 0 or 6:
the first UL/DL configuration is the UL/DL configuration 6 if a UL/DL configuration for the scheduling cell is the UL/DL configuration 6 and the UL/DL configuration for the scheduled cell is the UL/DL configuration 0, and
the first UL/DL configuration is the UL/DL configuration 0, the UL/DL configuration 6, or a UL/DL configuration 1 if a UL/DL configuration for the scheduling cell is the UL/DL configuration 0 and the UL/DL configuration for the scheduled cell is the UL/DL configuration 6.

28. The UE of claim 16, wherein, if the scheduling policy of the UE is the half-duplex non-cross-carrier scheduling, the specific cell is a non-cross-carrier scheduled cell, a UL/DL configuration for a primary cell (PCell) is a UL/DL configuration 0 or 6, and a UL/DL configuration for the non-cross-carrier scheduled cell is the UL/DL configuration 0 or 6:
the first UL/DL configuration is the UL/DL configuration 0 or a UL/DL configuration 1 if a UL/DL configuration for the PCell is the UL/DL configuration 6 and the UL/DL configuration for the non-cross-carrier scheduled cell is the UL/DL configuration 0, and the first UL/DL configuration is the UL/DL configuration 0 or 6 if a UL/DL configuration for the PCell is the UL/DL configuration 0 and the UL/DL configuration for the non-cross-carrier scheduled cell is the UL/DL configuration 6.

29. A method for receiving a physical uplink shared channel (PUSCH) signal by a base station (BS) in a communication system supporting a carrier aggregation (CA) scheme, the method comprising:
receiving, from a user equipment (UE), a PUSCH signal for a specific cell based on a PUSCH timing relationship for the specific cell,
wherein the UE is configured with at least two cells including the specific cell, and uplink (UL)/downlink (DL) configurations for the at least two cells are different,
wherein the PUSCH timing relationship for the specific cell is determined according to at least a transmission mode of the UE, a scheduling policy of the UE, and a PUSCH timing relationship corresponding to a first UL/DL configuration among UL/DL configurations supported in the communication system, and
wherein the transmission mode of the UE is one of a full-duplex transmission mode and a half-duplex transmission mode, and the scheduling policy of the UE is one of a cross-carrier scheduling, a non-cross-carrier scheduling, a full-duplex cross-carrier scheduling, and a half-duplex cross-carrier scheduling.

30. The method of claim 29, wherein the PUSCH timing relationship for the specific cell includes at least one of a timing relationship from a UL grant to a PUSCH, a timing relationship from a physical hybrid automatic repeat request (HARQ) indicator channel (PHICH) to a PUSCH, and a timing relationship from a PUSCH to a PHICH.

31. The method of claim 30, wherein, if the scheduling policy of the UE is the cross-carrier scheduling, the transmission mode of the UE is the full-duplex transmission mode, and the specific cell is a scheduling cell, the first UL/DL configuration is a UL/DL configuration for the scheduling cell,
wherein, if the scheduling policy of the UE is the cross-carrier scheduling, the transmission mode of the UE is the full-duplex transmission mode, and the specific cell is a scheduled cell, the first UL/DL configuration is a specific UL/DL configuration among the UL/DL configurations supported in the communication system, and
wherein the scheduling cell is a cell that receives a UL grant or HARQ-acknowledgement (ACK), and the scheduled cell is a cell that transmits the PUSCH signal.

32. The method of claim 31, wherein the specific UL/DL configuration is a UL/DL configuration that satisfies one of a first condition and a second condition,
wherein the first condition is a condition in which serial numbers of sub-frames where a PUSCH signal transmission is located are the same if the UL/DL configuration for the scheduled cell is one of UL/DL configurations 1, 2, 3, 4, and 5, for cross-carrier scheduled PUSCHs which have a same HARQ identifier (ID), and
wherein the second condition is a condition in which serial numbers of sub-frames where a PUSCH signal transmission is located are different if the UL/DL configuration for the scheduled cell is one of UL/DL configurations 0 and 6, for cross-carrier scheduled PUSCHs which have a same HARQ ID.

33. The method of claim 32, wherein, if there are a plurality of UL/DL configurations that satisfy the first condition or the second condition, the specific UL/DL configuration is a UL/DL configuration that is determined based on a priority among the plurality of UL/DL configurations.

34. The method of claim 33, wherein the priority is determined based on priorities for UL/DL configurations for the scheduling cell and priorities for UL/DL configurations for the scheduled cell.

35. The method of claim 31, wherein the specific UL/DL configuration satisfies a condition in which a maximum number of UL sub-frames will be scheduled based on the PUSCH timing relationship.

36. The method of claim 35, wherein, if there are a plurality of UL/DL configurations that satisfy the condition, the specific UL/DL configuration is a UL/DL configuration that is determined based on a priority among the plurality of UL/DL configurations.

37. The method of claim 36, wherein the priority is determined based on priorities for UL/DL configurations for the scheduling cell and priorities for UL/DL configurations for the scheduled cell.

38. The method of claim 36, wherein, if the scheduling policy of the UE is the non-cross-carrier scheduling, the transmission mode of the UE is the half-duplex transmission mode, and the specific cell is a secondary cell (SCell):
the first UL/DL configuration is a UL/DL configuration 0 if a UL/DL configuration for the SCell is the UL/DL configuration 0,
the first UL/DL configuration is a UL/DL configuration 0 if a UL/DL configuration for the SCell is a UL/DL configuration 6 and a UL/DL configuration for a primary cell (PCell) is the UL/DL configuration 0,
the first UL/DL configuration is a UL/DL configuration 6 if a UL/DL configuration for a PCell is different from a UL/DL configuration 0, and
the first UL/DL configuration is determined based on a number and positions of DL frames that the SCell may use if a UL/DL configuration for the SCell is different from UL/DL configurations 0 and 6.

39. The method of claim 30, wherein, if the scheduling policy of the UE is the non-cross-carrier scheduling, the transmission mode of the UE is the half-duplex transmission mode, and the specific cell is a secondary cell (SCell):
the first UL/DL configuration is a UL/DL configuration 0 or 6 if a UL/DL configuration for the SCell is the UL/DL configuration 0 or 6, and
the first UL/DL configuration is determined based on a number of UL frames that may be scheduled based on the PUSCH timing relationship if a UL/DL configuration for the SCell is different from UL/DL configurations 0 and 6.

40. The method of claim 30, wherein, if the scheduling policy of the UE is the full-duplex cross-carrier scheduling, the specific cell is a scheduled cell, a UL/DL configuration for a primary cell (PCell) is a UL/DL configuration 0 or 6, and a UL/DL configuration for the scheduled cell is the UL/DL configuration 0 or 6:
the first UL/DL configuration is the UL/DL configuration 0 or 6 if a UL/DL configuration for the scheduling cell is the UL/DL configuration 6 and the UL/DL configuration for the scheduled cell is the UL/DL configuration 0, and
the first UL/DL configuration is the UL/DL configuration 0 or 6 if a UL/DL configuration for the scheduling cell is the UL/DL configuration 0 and the UL/DL configuration for the scheduled cell is the UL/DL configuration 6.

41. The method of claim 30, wherein, if the scheduling policy of the UE is the half-duplex cross-carrier scheduling, the specific cell is a scheduled cell, a UL/DL configuration for a primary cell (PCell) is a UL/DL configuration 0 or 6, and a UL/DL configuration for the scheduled cell is the UL/DL configuration 0 or 6:
the first UL/DL configuration is the UL/DL configuration 6 if a UL/DL configuration for the scheduling cell is the UL/DL configuration 6 and the UL/DL configuration for the scheduled cell is the UL/DL configuration 0, and
the first UL/DL configuration is the UL/DL configuration 0, the UL/DL configuration 6, or a UL/DL configuration 1 if a UL/DL configuration for the scheduling cell is the UL/DL configuration 0 and the UL/DL configuration for the scheduled cell is the UL/DL configuration 6.

42. The method of claim 30, wherein, if the scheduling policy of the UE is the half-duplex non-cross-carrier scheduling, the specific cell is a non-cross-carrier scheduled cell, a UL/DL configuration for a primary cell (PCell) is a UL/DL configuration 0 or 6, and a UL/DL configuration for the non-cross-carrier scheduled cell is the UL/DL configuration 0 or 6:
the first UL/DL configuration is the UL/DL configuration 0 or a UL/DL configuration 1 if a UL/DL configuration for the PCell is the UL/DL configuration 6 and the UL/DL configuration for the non-cross-carrier scheduled cell is the UL/DL configuration 0, and
the first UL/DL configuration is the UL/DL configuration 0 or 6 if a UL/DL configuration for the PCell is the UL/DL configuration 0 and the UL/DL configuration for the non-cross-carrier scheduled cell is the UL/DL configuration 6.

43. A base station (BS) in a communication system supporting a carrier aggregation (CA) scheme, the BS comprising:
a receiver configured to receive, from a user equipment (UE), a physical uplink shared channel (PUSCH) signal for a specific cell based on a PUSCH timing relationship for the specific cell,
wherein the UE is configured with at least two cells including the specific cell, and uplink (UL)/downlink (DL) configurations for the at least two cells are different, and
wherein the PUSCH timing relationship for the specific cell is determined according to at least a transmission mode of the UE, a scheduling policy of the UE, and a PUSCH timing relationship corresponding to a first UL/DL configuration among UL/DL configurations supported in the communication system, and
wherein the transmission mode of the UE is one of a full-duplex transmission mode and a half-duplex transmission mode, and the scheduling policy of the UE is one of a cross-carrier scheduling, a non-cross-carrier scheduling, a full-duplex cross-carrier scheduling, and a half-duplex cross-carrier scheduling.

44. The BS of claim 43, wherein the PUSCH timing relationship for the specific cell includes at least one of a timing relationship from a UL grant to a PUSCH, a timing relationship from a physical hybrid automatic repeat request (HARQ) indicator channel (PHICH) to a PUSCH, and a timing relationship from a PUSCH to a PHICH.

45. The BS of claim 44, wherein, if the scheduling policy of the UE is the cross-carrier scheduling, the transmission mode of the UE is the full-duplex transmission mode, and the specific cell is a scheduling cell, the first UL/DL configuration is a UL/DL configuration for the scheduling cell,
wherein, if the scheduling policy of the UE is the cross-carrier scheduling, the transmission mode of the UE is the full-duplex transmission mode, and the specific cell is a scheduled cell, the first UL/DL configuration is a specific UL/DL configuration among the UL/DL configurations supported in the communication system, and
wherein the scheduling cell is a cell that receives a UL grant or HARQ-acknowledgement (ACK), and the scheduled cell is a cell that transmits the PUSCH signal.

46. The BS of claim 45, wherein the specific UL/DL configuration is a UL/DL configuration that satisfies one of a first condition and a second condition,
wherein the first condition is a condition in which serial numbers of sub-frames where a PUSCH signal transmission is located are the same if the UL/DL configuration for the scheduled cell is one of UL/DL configurations 1, 2, 3, 4, and 5, for cross-carrier scheduled PUSCHs which have a same HARQ identifier (ID), and
wherein the second condition is a condition in which serial numbers of sub-frames where a PUSCH signal transmission is located are different if the UL/DL configuration for the scheduled cell is one of UL/DL configurations 0 and 6, for cross-carrier scheduled PUSCHs which have a same HARQ ID.

47. The BS of claim 46, wherein, if there are a plurality of UL/DL configurations that satisfy the first condition or the second condition, the specific UL/DL configuration is a UL/DL configuration that is determined based on a priority among the plurality of UL/DL configurations.

48. The BS of claim 47, wherein the priority is determined based on priorities for UL/DL configurations for the scheduling cell and priorities for UL/DL configurations for the scheduled cell.

49. The BS of claim 45, wherein the specific UL/DL configuration satisfies a condition in which a maximum number of UL sub-frames will be scheduled based on the PUSCH timing relationship.

50. The BS of claim 49, wherein, if there are a plurality of UL/DL configurations that satisfy the condition, the specific UL/DL configuration is a UL/DL configuration that is determined based on a priority among the plurality of UL/DL configurations.

51. The BS of claim 50, wherein the priority is determined based on priorities for UL/DL configurations for the scheduling cell and priorities for UL/DL configurations for the scheduled cell.

52. The BS of claim 44, wherein, if the scheduling policy of the UE is the non-cross-carrier scheduling, the transmission mode of the UE is the half-duplex transmission mode, and the specific cell is a secondary cell (SCell):
the first UL/DL configuration is a UL/DL configuration 0 if a UL/DL configuration for the SCell is the UL/DL configuration 0,
the first UL/DL configuration is a UL/DL configuration 0 if a UL/DL configuration for the SCell is a UL/DL configuration 6 and a UL/DL configuration for a primary cell (PCell) is the UL/DL configuration 0,
the first UL/DL configuration is a UL/DL configuration 6 if a UL/DL configuration for a PCell is different from a UL/DL configuration 0, and
the first UL/DL configuration is determined based on a number and positions of DL frames that the SCell may use if a UL/DL configuration for the SCell is different from UL/DL configurations 0 and 6.

53. The BS of claim 44, wherein, if the scheduling policy of the UE is the non-cross-carrier scheduling, the transmission mode of the UE is the half-duplex transmission mode, and the specific cell is a secondary cell (SCell):
the first UL/DL configuration is a UL/DL configuration 0 or 6 if a UL/DL configuration for the SCell is the UL/DL configuration 0 or 6, and
the first UL/DL configuration is determined based on a number of UL frames that may be scheduled based on the PUSCH timing relationship if a UL/DL configuration for the SCell is different from UL/DL configurations 0 and 6.

54. The BS of claim 44, wherein, if the scheduling policy of the UE is the full-duplex cross-carrier scheduling, the specific cell is a scheduled cell, a UL/DL configuration for a primary cell (PCell) is a UL/DL configuration 0 or 6, and a UL/DL configuration for the scheduled cell is the UL/DL configuration 0 or 6:
the first UL/DL configuration is the UL/DL configuration 0 or 6 if a UL/DL configuration for the scheduling cell is the UL/DL configuration 6 and the UL/DL configuration for the scheduled cell is the UL/DL configuration 0, and
the first UL/DL configuration is the UL/DL configuration 0 or 6 if a UL/DL configuration for the scheduling cell is the UL/DL configuration 0 and the UL/DL configuration for the scheduled cell is the UL/DL configuration 6.

55. The BS of claim 44, wherein, if the scheduling policy of the UE is the half-duplex cross-carrier scheduling, the specific cell is a scheduled cell, a UL/DL configuration for a primary cell (PCell) is a UL/DL configuration 0 or 6, and a UL/DL configuration for the scheduled cell is the UL/DL configuration 0 or 6:
the first UL/DL configuration is the UL/DL configuration 6 if a UL/DL configuration for the scheduling cell is the UL/DL configuration 6 and the UL/DL configuration for the scheduled cell is the UL/DL configuration 0, and
the first UL/DL configuration is the UL/DL configuration 0, the UL/DL configuration 6, or a UL/DL configuration 1 if a UL/DL configuration for the scheduling cell is the UL/DL configuration 0 and the UL/DL configuration for the scheduled cell is the UL/DL configuration 6.

56. The BS of claim 44, wherein, if the scheduling policy of the UE is the half-duplex non-cross-carrier scheduling, the specific cell is a non-cross-carrier scheduled cell, a UL/DL configuration for a primary cell (PCell) is a UL/DL configuration 0 or 6, and a UL/DL configuration for the non-cross-carrier scheduled cell is the UL/DL configuration 0 or 6:
the first UL/DL configuration is the UL/DL configuration 0 or a UL/DL configuration 1 if a UL/DL configuration for the PCell is the UL/DL configuration 6 and the UL/DL configuration for the non-cross-carrier scheduled cell is the UL/DL configuration 0, and
the first UL/DL configuration is the UL/DL configuration 0 or 6 if a UL/DL configuration for the PCell is the UL/DL configuration 0 and the UL/DL configuration for the non-cross-carrier scheduled cell is the UL/DL configuration 6.

* * * * *